(12) United States Patent
Xue et al.

(10) Patent No.: US 9,179,441 B2
(45) Date of Patent: Nov. 3, 2015

(54) RESOURCE ALLOCATION METHOD AND APPARATUS

(71) Applicant: Huawei Technologies Co., Ltd., Shenzhen, Guangdong (CN)

(72) Inventors: Lixia Xue, Shenzhen (CN); Fredrik Berggren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 13/748,019

(22) Filed: Jan. 23, 2013

(65) Prior Publication Data

US 2013/0128852 A1 May 23, 2013

Related U.S. Application Data

(63) Continuation of application No. PCT/CN2011/074656, filed on May 25, 2011.

(30) Foreign Application Priority Data

Jul. 23, 2010 (CN) .......................... 2010 1 0239478

(51) Int. Cl.
*H04W 72/04* (2009.01)
*H04W 72/12* (2009.01)
*H04L 5/00* (2006.01)
(Continued)

(52) U.S. Cl.
CPC ............. *H04W 72/04* (2013.01); *H04L 5/0044* (2013.01); *H04L 5/0053* (2013.01); *H04W 72/1252* (2013.01); *H04L 5/0094* (2013.01); *H04L 27/0008* (2013.01); *H04W 28/06* (2013.01); *H04W 72/0486* (2013.01)

(58) Field of Classification Search
None
See application file for complete search history.

(56) References Cited

U.S. PATENT DOCUMENTS 7,979,769 B2 *  7/2011  Chun et al. .................... 714/748
8,379,587 B2 *  2/2013  Parkvall et al. ............... 370/329
(Continued)

FOREIGN PATENT DOCUMENTS

| CN | 101047585 A | 10/2007 |
| CN | 101309460 A | 11/2008 |

(Continued)

OTHER PUBLICATIONS

LTE, Evolved Universal Terrestrial Radio Access (E-UTRA); Physical Layer Procedures, Oct. 2009; ETSI TS 136 213 v8.8.0 (Oct. 2009).*

(Continued)

*Primary Examiner* — Huy D Vu
*Assistant Examiner* — Hong Shao
(74) *Attorney, Agent, or Firm* — Leydig, Voit & Mayer, Ltd.

(57) ABSTRACT

The present invention discloses a resource allocation method and apparatus, wherein the method comprises: determining a first resource block group size corresponding to a first resource allocation type in the common resource area; and dividing all resource blocks in the common resource area of the carrier into one or more resource block groups; determining a second resource block group size corresponding to the first resource allocation type in the dedicated resource area; and according to the second resource block group size, dividing resource blocks in the dedicated resource area of the carrier into one or more resource block groups.

23 Claims, 7 Drawing Sheets

(51) Int. Cl.
    *H04W 28/06*    (2009.01)
    *H04L 27/00*    (2006.01)

(56) References Cited

U.S. PATENT DOCUMENTS

| | | | |
|---|---|---|---|
| 8,493,835 B2* | 7/2013 | Gaal et al. | 370/208 |
| 8,521,881 B2* | 8/2013 | Awad et al. | 709/226 |
| 8,532,050 B2* | 9/2013 | Awad | 370/330 |
| 2002/0041566 A1 | 4/2002 | Yang et al. | |
| 2011/0113433 A1 | 5/2011 | Koyanagi et al. | |
| 2011/0199933 A1 | 8/2011 | Liu et al. | |
| 2011/0205995 A1* | 8/2011 | Grovlen | 370/329 |
| 2012/0115526 A1* | 5/2012 | Ogawa et al. | 455/509 |

FOREIGN PATENT DOCUMENTS

| | | | | |
|---|---|---|---|---|
| CN | 101616484 A | 12/2009 | | |
| CN | 101686495 A | 3/2010 | | |
| CN | 101765208 A | 6/2010 | | |
| EP | 2293633 A1 | 3/2011 | | |
| GB | 2464987 A | 5/2010 | | |
| GB | 2464989 | * | 5/2010 | H04W 72/04 |
| WO | WO 2009154271 A1 | 12/2009 | | |
| WO | WO 2010035067 A2 | 4/2010 | | |
| WO | WO 2010061717 A1 | 6/2010 | | |

OTHER PUBLICATIONS

Extended European Search Report in corresponding European Patent Application No. 11789140.8 (Jun. 11, 2013).
"TS 36.211—3rd Generation Partnership Project; Technical Specification Group Radio Access Network; Evolved Universal Terrestrial Radio Access (E-UTRA); Physical Channels and Modulation (Release 9)," Mar. 2010, V9.1.0, 3GPP, Valbonne, France.
"TS 36.213—3rd Generation Partnership Project; Technical Specification Group Radio Access Network; Evolved Universal Terrestrial Radio Access (E-UTRA); Physical layer procedures (Release 9)," Jun. 2010, V9.2.0, 3GPP, Valbonne, France.
Chinese Search Report in corresponding Chinese Patent Application No. 201010239478.1 (Jul. 25, 2013).
"R1-100491—Comparison of Carrier Segment and Extension Carrier for Contiguous Carrier Aggregation," 3GPP TSG-RAN WG' Meeting #59bis, Jan. 18-22, 2010, Agenda Item 7.1.1, 3GPP, Valbonne, France.
Written Opinion of the International Searching Authority in corresponding PCT Patent Application No. PCT/CN2011/074656 (Sep. 8, 2011).
International Search Report in corresponding PCT Patent Application No. PCT/CN2011/074656 (Sep. 8, 2011).
"LTE; Evolved Universal Terrestrial Radio Access (E-UTRA); Physical Layer Procedures (3GPP TS 36.213 Version 8.3.0 Releases 8)," ETSI TS 136 213, V8.3.0, pp. 1-46, European Telecommunications Standards Institute, Valbonne, France (Nov. 2008).

* cited by examiner

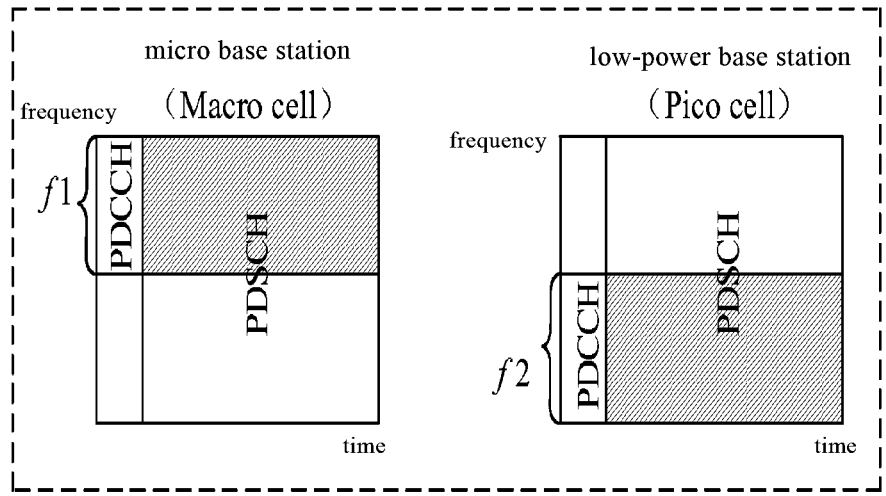

FIG. 3

| according to the RB number of resource blocks included in the common resource area and the corresponding relationship between RB number and RBG size that has been set in advance by the system, obtaining the RBG size in the common resource area; and according to the RBG size, determining the first number of bits required for indicating the common resource area | 301 |

| according to the maximum number of bits of the resource allocation field corresponding to the entire carrier and the first number of bits, determining a second number of bits of the resource allocation field corresponding to the dedicated resource area; according to the RB number of resource blocks in the dedicated resource area and the second bit number, determining the RBG size corresponding to the first resource allocation type in the dedicated resource area | 302 |

| according to the RBG size in the common resource area and the RBG size in the dedicated resource area, dividing the carrier into RBGs | 303 |

FIG. 4

RESOURCE ALLOCATION METHOD AND APPARATUS

CROSS-REFERENCE TO RELATED APPLICATIONS

This application is a continuation of International Patent Application No. PCT/CN2011/074656, filed on May 25, 2011, which claims priority to Chinese Patent Application No. 201010239478.1, filed on Jul. 23, 2010, both of which are hereby incorporated by reference in their entireties.

TECHNICAL FIELD

Embodiments of the present invention relate to the field of communication technology, and more particularly, to a resource allocation method and a resource allocation apparatus.

BACKGROUND

In a heterogeneous network, there exists a carrier structure in which a control channel, such as Physical Downlink Control Channel (Physical Downlink Control Channel, PDCCH for short), only occupies part of the whole bandwidth of the carrier instead of being extended or mapped to the whole system bandwidth of the carrier as in a Long Term Evolution (Long Term Evolution, LTE for short) system. Based on the carrier structure in which the control channel only occupies part of the whole bandwidth of the carrier, macro base station and low-power base station can use frequency bands that are not overlapped to transmit control channel (including PDCCH or PHICH or PCFICH) and public control channel PBCH or SCH. In LTE system, PDCCH control signalling schedules time-frequency resources used by a terminal for receiving or transmitting data. For a resource allocation type "0", a minimum granularity for scheduling data resources is a resource block group (resource block group, RBG for short). The RBG size is related to the system bandwidth. Generally, the larger the system bandwidth is, the larger the RBG is. Allocation of each RBG can be indicated using one bit in a resource allocation field in PDCCH, that is, can be indicated in a bitmap manner. With the increase of system bandwidth, the number of bits in the resource allocation field increases, but it does not increase linearly because RBG also increases with the increase of system bandwidth. Physical channels for data transmission include Physical Downlink Shared Channel (Physical Downlink Shared Channel, PDSCH for short) and Physic Uplink Shared Channel (Physic Uplink Shared Channel, PUSCH for short).

For a UE in LTE system Version 8 or 9 (hereinafter, abbreviated as R8 or R9 UE), PDCCH and PDSCH use the same system bandwidth. The size of a resource block group for R8 or R9 UE with the resource allocation type "0" is determined according to the number of resource blocks (resource block, RB for short) contained in this system bandwidth. However, for a terminal such as Version 10 terminal (hereinafter abbreviated as R10 UE), when the new carrier structure is applied, system bandwidths used by corresponding PDCCH and PDSCH can be unequal. If it is still necessary to support both R8 UE and R10 UE or both R9 UE and R10 UE, then the system bandwidth that can be scheduled for data transmission for R10 UE is different from the system bandwidth that can be scheduled for data transmission for R8 or R9 UE on the same carrier. In the prior art, a method for determining the size of a resource block group of UE goes as follows: determining the RBG size of the resource scheduled by the terminal according to the system bandwidth available to the UE as well as the relationship between the system bandwidth and the RBG. Here, for R8 or R9 UE, the RBG size can be determined according to the bandwidth available to the R8 or R9 UE. For R10 UE, the RBG size can be determined according to the whole system bandwidth of the carrier.

Within the system bandwidth corresponding to a common resource area of R8 UE and R10 UE, or within the system bandwidth corresponding to a common resource area of R9 UE and R10 UE, the RBG size for R8 UE and the RBG size for R10 UE may be unequal, or the RBG size for R9 UE and the RBG size for R10 UE may be unequal. Therefore, a scheduler in the base station needs to perform scheduling according to the respective resource block group sizes for different versions of UEs, which makes it complex for the base station to schedule these RBGs and easily results in repeated allocation of resources or waste of resources.

SUMMARY

The embodiments of the present invention provide a resource allocation method and a resource allocation apparatus, for addressing problems of high complexity of scheduling, repeated allocation of resources or waste of resources due to unequal RBG sizes in the common resource area during the scheduling process in the prior art. As a result, different versions of UEs have the same RBG size in the common resource area of the carrier, the scheduling process is simplified, the repeated allocation of resources is reduced, and the bandwidth resource is saved.

An embodiment of the present invention provides a resource allocation method, comprising:

according to the number of resource blocks in a common resource area of a carrier and a set first corresponding relationship, determining a first resource block group size corresponding to a first resource allocation type in the common resource area, wherein the first corresponding relationship is corresponding relationship between the number of resource blocks and a resource block group size, and according to the first resource block group size, dividing all resource blocks in the common resource area of the carrier into one or more resource block groups, wherein the carrier including comprises the common resource area and a dedicated resource area;

according to the first resource block group size, or according to the total number of resource blocks of the carrier and the first corresponding relationship, determining a second resource block group size corresponding to the first resource allocation type in the dedicated resource area, and according to the second resource block group size, dividing resource blocks in the dedicated resource area of the carrier into one or more resource block groups, wherein each one of the one or more resource block groups divided from in the dedicated resource area corresponds to an indication for indicating whether or not the resource block group is to be scheduled to a user equipment, and sending the indication to the user equipment.

An embodiment of the present invention provides a resource allocation method, comprising:

according to the number of resource blocks in a common resource area of a carrier and a set second corresponding relationship, or according to a first resource block group size of a first resource allocation type, determining the number of resource block group subsets corresponding to a second resource allocation type in the common resource area of the carrier, wherein the carrier includes the common resource area and a dedicated resource area, and the second corresponding relationship is a corresponding relationship between the number of resource blocks and the number of resource block group subsets, and allocating resource block groups of the carrier into the resource block group subsets;

determining the total number of bits of a resource allocation field corresponding to the second resource allocation type; and according to the total number of bits of the resource allocation field corresponding to the second resource allocation type, the number of bits required for indicating the resource block group subsets, and the number of bits required for indicating a resource allocation direction, determining the number of bits indicating resource allocation of the resource block group subsets of the second resource allocation type; according to the number of bits indicating the resource allocation of the resource block group subsets, determining an indication that indicates whether or not a resource block in each resource block group subset is to be scheduled to a user equipment; and sending the indication to the user equipment.

An embodiment of the present invention also provides a resource allocation apparatus, comprising:

a first resource allocation module, configured to according to the number of resource blocks in a common resource area of a carrier and a set first corresponding relationship that has been set, determining a first resource block group size corresponding to a first resource allocation type in the common resource area, wherein the first corresponding relationship being is a corresponding relationship between the number of resource blocks and a resource block group size; and according to the first resource block group size, dividing divide all resource blocks in the common resource area of the carrier into one or more resource block groups, wherein the carrier comprises including the common resource area and a dedicated resource area; and a second resource allocation module, configured to according to the first resource block group size determined by the first resource allocation module, or according to the total number of resource blocks of the carrier and the first corresponding relationship, determining a second resource block group size corresponding to the first resource allocation type in the dedicated resource area; and according to the second resource block group size, dividing divide resource blocks in the dedicated resource area of the carrier into one or more resource block groups, wherein each one of the one or more resource block groups divided from formed by dividing resource blocks in the dedicated resource area corresponds to an indication for indicating whether or not the resource block group is to be scheduled to a user equipment, and then sending the indication to the user equipment.

An embodiment of the present invention also provides a resource allocation apparatus, comprising:

a third resource allocation module, configured to according to the number of resource blocks in a common resource area of a carrier and a set second corresponding relationship, or according to a first resource block group size of a first resource allocation type, determine the number of resource block group subsets corresponding to a second resource allocation type, wherein the carrier comprises the common resource area and a dedicated resource area, and the second corresponding relationship is corresponding relationship between the number of resource blocks and the number of resource block group subsets, and allocate resource block groups of the carrier into the resource block group subsets;

a total number of bits determination module, configured for to determining determine the total number of bits of a resource allocation field corresponding to the second resource allocation type; and a fourth resource allocation module, configured to according to the total number of bits of the resource allocation field corresponding to the second resource allocation type determined by the total number of bits determination module, the number of bits required for indicating the resource block group subsets, and the number of bits required for indicating a resource allocation direction, determining the number of bits indicating resource allocation of the resource block group subsets of the second resource allocation type; according to the number of bits indicating the resource allocation of the resource block group subsets, determining determine an indication that indicates whether or not a resource block in each resource block group subset is to be scheduled to a user equipment; and sending the indication to the user equipment.

According to the resource allocation method and apparatus provided by the present invention, the resource block group size corresponding to the common resource area is the first resource block group size, and according to the first resource block group size, or according to the total number of resource blocks of the carrier as well as the corresponding relationship between the number of resource blocks and the resource block group size, the second resource block group size corresponding to the dedicated resource area can be determined, and different versions of terminals will have the same resource block group size in the common resource area of the carrier. Therefore, the scheduling process is simplified, the repeated allocation of resources is reduced, and the bandwidth resource is saved.

BRIEF DESCRIPTION OF THE DRAWINGS

In order to more clearly explain the technical solutions according to the embodiments of the present invention or in the prior art, the accompany drawings that need to be used in the description of the embodiments or the prior art will be briefly introduced. Apparently, the accompanying drawings in the following description are only some embodiments of the present invention, and one of ordinary skill in the art can obtain other drawings based on these accompanying drawings without paying any creative efforts.

FIG. 3 is a schematic view of control channel shrinking in the first embodiment of the resource allocation method of the present invention;

FIG. 4 is a flowchart of a second embodiment of the resource allocation method of the present invention;

DESCRIPTION OF THE EMBODIMENTS

In order to make the objects, the technical solutions and the advantages of the embodiments of the present invention clearer, technical solutions in the embodiments of the present invention will be described clearly and completely in conjunction with the accompanying drawings. Apparently, the described embodiments are part of the embodiments of the present invention, instead of all the embodiments. Based on the embodiments in this description, one of ordinary skill in the art can obtain all other embodiments without pay any creative efforts, which fall into the claimed scope of the present invention.

Figures 1, 2:
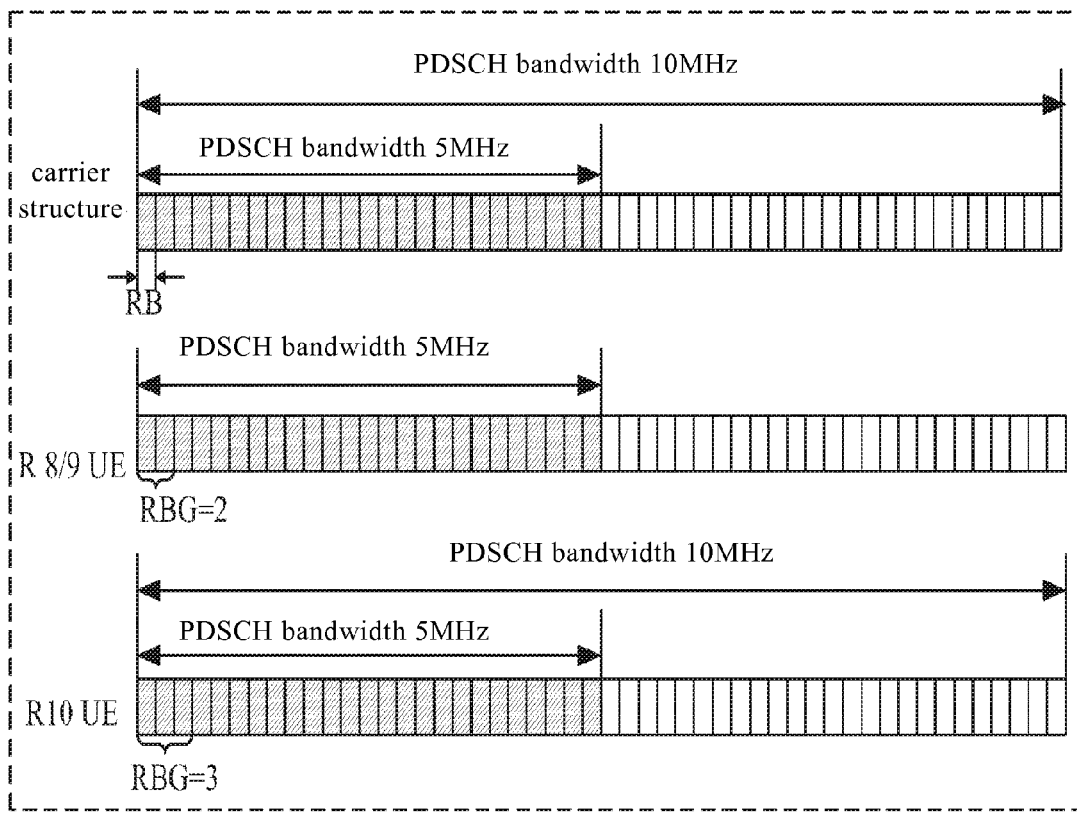
FIG. 1 is a flowchart of a first embodiment of the resource allocation method of the present invention.
FIG. 2 is a schematic view of a carrier structure in the embodiments of the present invention.

FIG. 1 is a flowchart of a first embodiment of the resource allocation method of the present invention. As shown in FIG. 1, this resource allocation method comprises the following steps.

Step 101: according to a number of resource blocks in a common resource area of a carrier and a set first corresponding relationship, determining a first resource block group size corresponding to a first resource allocation type in the common resource area, wherein the first corresponding relationship is corresponding relationship between the number of resource blocks and a resource block group size; and according to the first resource block group size, dividing all resource blocks in the common resource area of the carrier into one or more resource block groups, the carrier including the common resource area and a dedicated resource area.

Here, the common resource area refers to a resource area that can be used by both a terminal of a first system and a terminal of a second system within a carrier, wherein the second system can be an evolved system of the first system. The dedicated resource area refers to a bandwidth resource area that can be used only by the terminal of the second system but cannot be used by the terminal of the first system within a carrier. Taking a case in which the first system is LTE system while the second system is a LTE evolved system (i.e. LTE-A system) as an example, the terminal of the first system can be R8 UE or R9 UE, the terminal of the second system is a new version terminal, such as, R10 UE or a subsequent evolved version UE. In a new carrier structure, the resource area that can be used by both R8/R9 UE and R10 UE is the common resource area, whereas the resource area that can be used only by R10 UE but cannot be used by R8/R9 UE is the dedicated resource area.

As shown in FIG. 2, it is a schematic view of a carrier structure in the embodiments of the present invention. It is assumed that, control channel PDCCH of the carrier structure has a bandwidth of 5 MHz, data channel PDSCH used by R8/R9 UE also has a bandwidth of 5 MHz, and data channel PDSCH used by R10 UE has a bandwidth of 10 MHz. If the common resource area and the dedicated resource area are not distinguished from each other, it can be obtained from the following Table 1 that, the 10 MHz bandwidth of R10 UE includes 50 resource blocks, corresponding to a RBG size of "3", and the resource allocation field needs [50/3]=17 bits for indication; while the 5 MHz bandwidth for R8/R9 UE includes 25 resource blocks, corresponding to a RBG size of "2", and the resource allocation field needs [25/2]=13 bits for indication. At this point, the RBG size of R8/R9 UE and the RBG size of R10 UE are unequal, such that, within the common resource area for R8/R9 UE and R10 UE, the scheduler in the base station needs to perform scheduling in accordance with the respective resource block group size for the two different versions of terminals, which makes it complex for the base station to schedule these RBGs and easily results in repeated allocation of resources or waste of resources. If the common resource area and the dedicated resource area are distinguished, 5 MHz bandwidth out of the 10 MHz bandwidth of R10 UE belongs to the common resource area shared with R8/R9 UE, and this 5 MHz bandwidth comprises 25 resource blocks, corresponding to a RBG size of "2". At this point, R8/R9 UE and R10 UE have equal RBG sizes in the common resource area, and thus it is realized that RBG sizes in the common resource are equal, thereby simplifying the scheduling process, reducing repeated resource allocation, and saving bandwidth resource.

Here, FIG. 2 is merely a schematic view of a carrier structure in the embodiments of the present invention. This carrier structure is characterized in that control channel and data channel have different bandwidths. The particular control channel bandwidth and data channel bandwidth can take other values and can be configured flexibly according to the requirements of network services and operators. For example, the bandwidth of the control channel can be 10 MHz while the bandwidth of the data channel can be 20 MHz. The present invention is not limited thereto and the solutions of the present invention can be applied to any configuration with such a carrier structure.

TABLE 1

Corresponding relationship between the Number of Resource Blocks and the Size of Resource Block Group

| Number of Resource Blocks | Size of Resource Block Group (RBG size) |
|---|---|
| ≤10 | 1 |
| 11-26 | 2 |
| 27-63 | 3 |
| 64-110 | 4 |

The corresponding relationship between the number of resource blocks and the size of resource block group shown in Table 1 is the first corresponding relationship described above. Table 1 can be a corresponding relationship between the number of resource blocks and the size of resource block group defined in the first system such as LTE system. More particularly, this embodiment applies the corresponding relationship between the number of resource blocks and the size of resource block group defined in LTE R8/R9 system. However, Table 1 is merely an example of the corresponding relationship between the number of resource blocks and the size of resource block group, and the embodiments of the present invention do not limit the numeric values of the corresponding relationship between the number of resource blocks and the size of resource block group. Based on the number of resource blocks in the common resource area, the corresponding first resource block group size can be found in Table 1. Subsequently, a ratio of the number of resource blocks in the common resource area to the first resource block group size can be calculated, and then all resource blocks in the common resource area of the carrier are divided into one or more resource block groups according to this ratio.

There can be a plurality of resource allocation types in LTE system. In an embodiment of the present invention, it is assumed that, the first resource allocation type is a resource allocation type "0" while the second resource allocation type is a resource allocation type "1". For the resource allocation type "0", resource blocks in the carrier are divided into resource block groups, while for the resource allocation type "1", resource blocks in the carrier are divided into resource block group subsets. In this embodiment, the resource allocation type "0" is taken as an example for description.

As shown in FIG. 3, it is a schematic view of control channel shrinking in the first embodiment of the resource allocation method of the present invention. Taking control channel (e.g. PDCCH) and data channel (e.g. PDSCH) in LTE system as an example, the control channel of the LTE system extends to the entire system bandwidth deemed by R8/89 UE. In such way, R8/R9 UE can access over the shrink bandwidth corresponding to the control channel, and read bandwidth information of the corresponding control channel. According to the method of extending the control channel of R8/R9 UE of the LTE system to the entire system bandwidth, it is determined that its corresponding data channel is scheduled on the system bandwidth occupied by the control channel. If a micro base station and a low-power base station extend their control channel respectively to a system bandwidth f1 and a system bandwidth f2, then data of R8/R9 UE of the micro base station and of the low-power base station are respectively scheduled on the system bandwidth f1 and the system bandwidth f2, and R8/R9 UE of the micro base station and R8/R9 UE of the low-power base station respectively take f1 and f2 as their system bandwidths. However, for the LTE new version terminal (e.g. R10 UE or a subsequent evolved version UE), system bandwidths occupied by the control channel and data channel in use can be unequal, and its data channel can be transmitted over the bandwidth corresponding to the entire carrier. At this point, the schedule signalling transmitted on the control channel can indicate time frequency resource information of data transmission over the entire carrier. Thus, according to the size of the carrier frequency spectrum, coordination result for interference between the micro base station and the low-power base station, and potential resource requirements for the control channel and the data channel, various combinations of bandwidths of the control channel and the data channel of R10 UE can be obtained. For example, (10, 20) represents that the bandwidth occupied by PDCCH of R10 UE such as f1 or f2 shown in FIG. 3 is 10 MHz and the system bandwidth occupied by PDSCH is 20 MHz, wherein, the system bandwidth occupied by PDSCH includes the 10 MHz occupied by the PDCCH (i.e. the common resource area which can be used by both R8/R9 UE and R10 UE) and another 10 MHz which is mainly used for data transmission for R10 UE (i.e. the dedicated resource area which can be used only by R10 UE but cannot be used by R8/R9 UE). Of course, the other 10 MHz can also be used for transmitting PDCCH for R10 terminal. The entire carrier bandwidth corresponding to the carrier structure of FIG. 3 can be divided into two parts: one part corresponds to the bandwidth f1 or f2 of the control channel, which includes all control channels to be detected as required by the access of R8/R9 UE and R10 UE and has backwards compatibility, that is, the resource of the control channel and the data channel of this part can be used by both R8/R9 UE and R10 UE, which is thus called the common resource area; the other part corresponds to the remaining bandwidth other than the control channel f1 or f2, the resource of which is mainly used for data transmission, and this part is used by the new version R10 and the subsequent version UE and belongs to non-backwards compatible resource of the entire carrier, and thus is called as dedicated resource area or carrier segmentation. The above two parts are both described from the perspective of one base station.

At step 101, according to the number of resource blocks in the common resource area of the carrier as well as the corresponding relationship between the number of resource blocks and the size of resource block group set in Table 1, the base station can determine the first resource block group size corresponding to the first resource allocation type in the common resource area.

At step 102, according to the first resource block group size, or according to the total number of resource blocks of the carrier and the first corresponding relationship, a second resource block group size corresponding the first resource allocation type in the dedicated resource area can be determined, and according to the second resource block group size, resource blocks in the dedicated resource area of the carrier are divided into one or more resource block groups, wherein each resource block group corresponds to an indication for indicating whether or not the resource block group is to be scheduled to a user equipment, and then this indication is sent to the user equipment.

At step 102, determining the second resource block group size corresponding to the first resource allocation type in the dedicated resource area can be particularly carried out in two ways.

Way 1: determining the second resource block group size corresponding to the first resource allocation type in the dedicated resource area according to the first resource block group size, which specifically comprises the following steps.

Step A: according to the number of resource blocks in the common resource area and the first resource block group size, determining the number of resource block groups in the common resource area, and according to the number of resource block groups in the common resource area, determining the first number of bits of the resource allocation field for indicating the common resource area.

Here, if the number of resource blocks of the last resource block group in the common resource area is less than the first resource block group size, for a new version terminal, among the first number of bits of bits in the resource allocation field indicating the common resource area, the bit corresponding to the last resource block group in the common resource area may only indicate the last resource block group in the common resource area, or only indicate several resource blocks in the dedicated resource area that are adjacent to the last resource block group in the common resource area in their serial numbers, or indicate several resource blocks in both the dedicated resource area and the common resource area that are consecutive in the resource block serial number.

Step B: determining the second number of bits of the resource allocation field for indicating the dedicated resource area according to the first number of bits, which specifically may comprise: according to the maximum number of bits of the resource allocation field corresponding to the carrier, or according to the total number of resource blocks included in the carrier and the first corresponding relationship, determining the total number of bits of the resource allocation field corresponding to the carrier; and according to the total number of bits of the resource allocation field and the first number of bits, determining the second number of bits.

Here, at step B, according to the maximum number of bits of the resource allocation field corresponding to the carrier, or according to the total number of resource blocks included in the carrier and the first corresponding relationship, determining the total number of bits of the resource allocation field corresponding to the carrier, which can be particularly as follows:

Firstly, according to the maximum number of bits of the resource allocation field corresponding to the carrier, the total number of bits of the resource allocation field corresponding to the carrier is determined.

For example, according to the maximum system bandwidth configuration supported in the first system as well as its corresponding relationship for the number of resource blocks, by looking up the corresponding relationship between the number of resource blocks and the resource block group in the first system as shown in Table 1, the size of the resource block group of the first resource allocation type corresponding to the maximum system bandwidth configuration supported in the first system and the maximum number of bits of the resource allocation field are determined, and then it is determined that the maximum number of bits of the resource allocation field corresponding to the carrier is equal to the total number of bits of the resource allocation field of the first resource allocation type corresponding to the maximum system bandwidth configuration supported in the first system. For example, if the first system is LTE R8 system, the maximum system bandwidth supported thereby is 20 MHz, including 100 resource blocks; according to the corresponding relationship between the number of resource blocks and the resource block group in LTE R8 system (i.e. according to Table 1), it is determined that the size of resource block group of the first resource allocation type in LTE R8 system is "4", the total number of bits of the resource allocation field is "25", and then the maximum number of bits of the resource allocation field corresponding to the carrier is equal to the total number of bits of the resource allocation field corresponding to the 20 MHz in the LTE system, that is, 25 bits.

Secondly, according to the total number of resource blocks included in the carrier and the first corresponding relationship, the total number of bits of the resource allocation field corresponding to the carrier is determined.

For example, according to the bandwidth of the first system corresponding to the carrier and the corresponding number of resource blocks (as shown in Table 2), as well as the corresponding relationship between the number of resource blocks and the resource block group in the first system (as shown in Table 1), the resource block group size of the first resource allocation type corresponding to the bandwidth of the first system and the total number of bits of the resource allocation field are determined, and it is determined that the maximum number of bits of the resource allocation field corresponding to the carrier is equal to the total number of bits of the resource allocation field of the first resource allocation type corresponding to the bandwidth of the first system. For example, the system bandwidth of the carrier is 15 MHz, and the bandwidth of the first system is equal to the bandwidth corresponding to the carrier (that is, 15 MHz); if the first system is LTE R8 system, it can be known from Table 2 that its 15 MHz system bandwidth corresponds to 75 resource blocks, and it can be known from Table 1 that its resource allocation field and its resource block group size of the first resource allocation type is "4" and the total number of bits is "19"; then it can be determined that, the total number of bits of the resource allocation field corresponding to the carrier is equal to the total number of bits of the resource allocation field of the first resource allocation type corresponding to the 15 MHz bandwidth of the first system, i.e. "19".

In the above two methods, when the second system has introduced a new carrier structure, the number of bits of the resource allocation field can be kept at least same as the number of bits of one resource allocation field corresponding to the first system (see Table 1). Therefore, no new types will appear in the number of bits of the resource allocation bit field in PDCCH, and hence the length of PDCCH signalling will not be affected and the processing complexity of the base station and the terminal will not be increased.

In addition, the method at step B, i.e. determining the second number of bits of the resource allocation field for indicating the dedicated resource area according to the first number of bits, can particularly comprise the following examples.

Example 1: if the number of resource blocks of the last resource block group in the common resource area is equal to the first resource block group size, then according to the total number of bits of the resource allocation field and the first number of bits, determining the second number of bits as the difference between the total number of bits of the resource allocation field and the first number of bits.

Example 2: if the number of resource blocks of the last resource block group in the common resource area is less than the first resource block group size, then according to the total number of bits of the resource allocation field and the first number of bits, determining the second number of bits as a value obtained by adding one to the difference between the total number of bits of the resource allocation field and the first number of bits.

Example 3: if the number of resource blocks of the last resource block group in the common resource area is less than the first resource block group size, then according to the total number of bits of the resource allocation field and the first number of bits, determining the second number of bits as the difference between the total number of bits of the resource allocation field and the first number of bits.

Step C: according to the number of resource blocks in the dedicated resource area and the second number of bits, determining the second resource block group size. Step 203 may comprise the following examples, corresponding to Example 1, Example 2 and Example 3 comprised in the method of determining the second number of bits of the resource allocation field for indicating the dedicated resource area at step 202.

Example 1: if the number of resource blocks of the last resource block group in the common resource area is equal to the first resource block group size, dividing the number of resource blocks in the dedicated resource area by the second number of bits and rounding up the resulted quotient, thereby obtaining a first ratio.

If the first ratio is a positive integral multiple of the first resource block group size, the first ratio is determined as the second resource block group size; or, if the first ratio is not a positive integral multiple of the first resource block group size, a minimum integer larger than the first ratio and equal to a positive integral multiple of the first resource block group size is determined as the second resource block group size.

Example 2: if the number of resource blocks of the last resource block group in the common resource area is less than the first resource block group size, adding the number of resource blocks in the dedicated resource area and the number of resource blocks of the last resource block group in the common resource area to obtain a first total, and then dividing the first total by the second number of bits and rounding up the resulted quotient, thereby obtaining a first ratio.

If the first ratio is a positive integral multiple of the first resource block group size, the first ratio is determined as the second resource block group size; or, if the first ratio is not a positive integral multiple of the first resource block group size, a minimum integer larger than the first ratio and equal to a positive integral multiple of the first resource block group size is determined as the second resource block group size.

Example 3: if the number of resource blocks of the last resource block group in the common resource area is less than the first resource block group size, dividing the number of resource blocks in the dedicated resource area by the second number of bits and rounding up the resulted quotient, thereby obtaining a first ratio.

If the first ratio is a positive integral multiple of the first resource block group size, the first ratio is determined as the second resource block group size; or, if the first ratio is not a positive integral multiple of the first resource block group size, a minimum integer larger than the first ratio and equal to a positive integral multiple of the first resource block group size is determined as the second resource block group size.

Way 2: determining the second resource block group size corresponding to the first resource allocation type in the dedicated resource area according to the total number of resource blocks of the carrier and the first corresponding relationship.

Then, according to the number of resource blocks in the dedicated resource area and the second resource block group size, the number of resource block groups in the dedicated resource area is determined, and according to the number of resource block groups in the dedicated resource area, the second number of bits of the resource allocation field for indicating the dedicated resource area is determined.

In addition, a set value for the second resource block group size can be preset, which can be in accordance with the maximum resource block group size supported by the first system or by an evolved system of the first system (i.e. the second system), or in accordance with the maximum subband size of the supported channel state feedback (e.g. CQI feedback). For example, the maximum sub-band size (i.e. "6") of CQI feedback supported in the first system (i.e. LTE system) can be selected, such that it is compatible with the CQI feedback design in the LTE system, and other designs related to scheduling (e.g. CQI feedback) will not be affected due to the introduction of the second resource block group size. After determining the second resource block group size according to the foregoing Way 1 or Way 2, if the second resource block group size is larger than the set value, the second resource block group size is replaced with the set value, for example, "6" is employed as the second resource block group size.

In addition, at step 102, in the process of dividing all resource blocks in the dedicated resource area of the carrier into one or more resource block groups according to the second resource block group size, the resource block allocation method for the contiguous portions in the common resource area and the dedicated resource area can be as follows:

If the number of resource blocks of the last resource block group in the common resource area is less than the first resource block group size, the difference between the second resource block group size and the number of resource blocks of the last resource block group in the common resource area is calculated as a first difference.

The resource blocks of the last resource block group in the common resource area together with the resource blocks of a number equal to the first difference in the dedicated resource area that are adjacent to the common resource area in serial number are grouped into the first resource block group in the dedicated resource area. As a result, the first resource block group comprises both resource blocks in the common resource area and resource blocks in the dedicated resource area, and only one bit is used for indicating whether or not this resource block group is allocated. Alternatively, the resource blocks of a number equal to the first difference in the dedicated resource area that are adjacent to the common resource area in serial number are grouped into the first resource block group in the dedicated resource area. As a result, the first resource block group comprises only resource blocks in the dedicated resource area and one bit is used for indicating whether or not this resource block group is allocated. Next, according to the second resource block group size, resource blocks remaining in the dedicated resource area after removing the first resource block group are divided into one or more resource block groups.

In one carrier, if the first resource allocation type is employed for resource allocation, after dividing the common resource area and the dedicated resource area respectively into resource block groups, each resource block group has a corresponding bit that indicates whether or not this resource block group is scheduled.

In this embodiment, the resource block group size corresponding to the common resource area is the first resource block group size, and the second resource block group size corresponding to the dedicated resource area can be determined according to the first resource block group size or according to the total number of resource blocks of the carrier as well as the corresponding relationship between the number of resource blocks and the size of resource block group. The resource block groups in the common resource area of the carrier that supports different versions of terminal systems can have the same size, thereby simplifying scheduling process, reducing repeated resource allocation and saving bandwidth resource.

FIG. 4 is a flowchart of the second embodiment of the resource allocation method of the present invention. With the new carrier structure corresponding to the new version terminal of the evolved system (e.g. R10 UE), it is undesirable to influence the normal communication of the old version terminal (i.e. R8/R9 UE). For example, it is undesirable that new types appear in the number of bits of the resource allocation bit field in PDCCH thereby affecting the length of the PDCCH signalling, or combinations of uses of several bandwidths under the new carrier structure result in different number of bits of the resource allocation bit field in PDCCH, which increases the processing complexity of the base station and the terminal. In addition, a new PDCCH signalling length will require additional test work in the commercialization process, and thus, with the new carrier structure, the number of bits used in this embodiment of the present invention reuses the number of bits of the resource allocation field corresponding to the original system bandwidth, and can be applicable to variations of combinations of uses of several bandwidths under the new carrier structure.

During the process of resource allocation, the base station determines the RBG sizes respectively corresponding to the common resource area and the dedicated resource area of the carrier bandwidth, thereby obtaining the number of resource blocks included in all the resource block groups over the entire carrier bandwidth. Here, the common resource area can also be referred to as backwards compatible part and the dedicated resource area can also be referred to as non-backwards compatible part. As shown in FIG. 4, the process of this resource allocation can particularly comprise the following steps:

Step 301: according to the RB number $N_{RB}^{BC\text{-}Part}$ of resource blocks included in the common resource area as well as the corresponding relationship between RB number and RBG size that has been set in advance by the system as in Table 1 (i.e. the first corresponding relationship), obtaining the RBG size P corresponding to the common resource area (i.e. the first resource block group size), and then according to the RBG size, determining the resource allocation number of bits $\lceil N_{RB}^{BC\text{-}Part}/P \rceil$ required for indicating the common resource area, i.e. the first number of bits.

Figure 5:
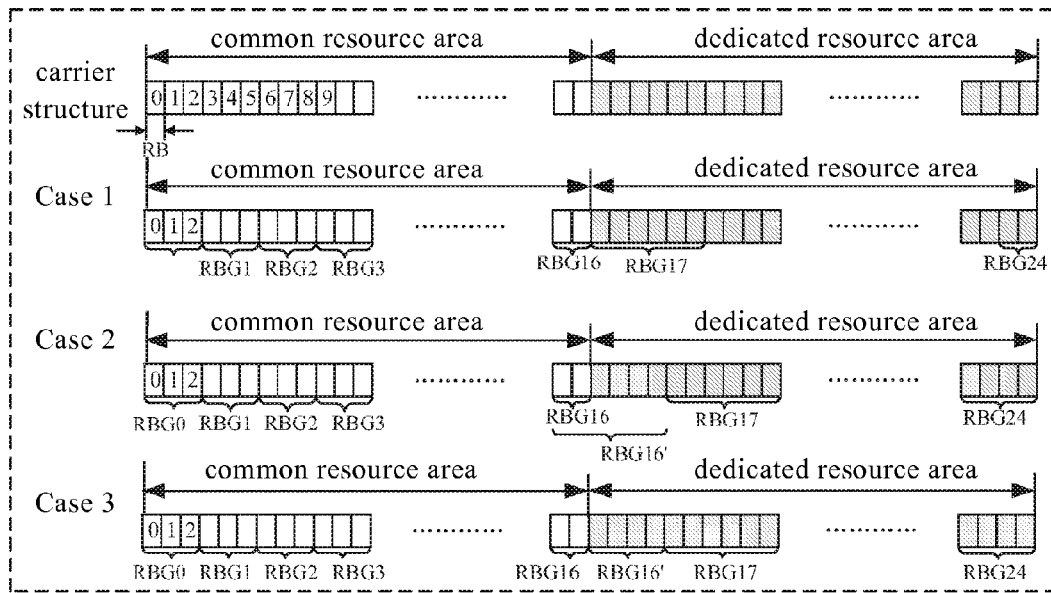
FIG. 5 is a schematic view of a resource allocation type "0" in the second embodiment of the resource allocation method of the present invention.

As shown in FIG. 5, it is a schematic view of the resource allocation type "0" in the second embodiment of the present invention. In the carrier structure, it is assumed that the common resource area has a bandwidth of 10 MHz, including "50" resource blocks; the dedicated resource area also has a bandwidth of 10 MHz, including "50" resource blocks. According to the RB number $N_{RB}^{BC\text{-}Part}$ of resource blocks included in the common resource area (i.e. 50 resource blocks) as well as the corresponding relationship between RB number and RBG size specified by the system as in Table 1, it can be obtained that the RBG size P corresponding to the resource allocation type "0" in the common resource area is "3", as Case 1, Case 2, and Case 3 in FIG. 5. The resource allocation number of bits required by the common resource area is determined as $\lceil N_{RB}^{BC\text{-}Part}/P \rceil = \lceil 50/3 \rceil = 17$. In LTE system, the RB number included in the RBG indicated by the last bit may be less than or equal to the resource block group size, dependent on whether or not the ratio of the RB number to the resource block group size is an integer. In this embodiment, for the original version terminal, i.e. R8/R9 UE, each bit thereof indicates a corresponding RBG in the common resource area, and in this example, the last bit indicates two resource blocks of RBG16. However, for the new version or the subsequent evolved terminal such as R10 UE, the RB number included in the RBG indicated by the last bit in the first number of bits of bits is "2", less than the resource block group size "3". For example, in Case 1 of FIG. 5, RBG16 indicated by the 17$^{th}$ bit only includes 2 RBs, such that, in the common resource area, the RB number included in each RBG indicated by the new version terminal or the old version terminal are all the same. Besides, as shown in Case 2 of FIG. 5, the 17$^{th}$ bit can be not exclusively used for indicating RBG16 (i.e., two RBs of RBG16), but indicates RBG16' as a common bit, which not only can indicate two resource blocks of RBG16 but also can indicate part of resource blocks in the dedicated resource area (e.g., 4 resource blocks in this example). As such, overhead of resource allocation bit can be saved; however, if RBG16 is scheduled to R8/R9 UE, part of resource blocks in other dedicated resource area (e.g., 4 resource blocks in this example) cannot be scheduled, which may result in waste of resources. Alternatively, as shown in Case 3 of FIG. 5, the 17$^{th}$ bit does not indicate RBG16, but indicates RBG16', that is, it only indicates part of resource blocks in the dedicated resource area (e.g., 4 resource blocks in this example). In this way, after RBG16 is scheduled to R8/R9 UE, part of resource blocks in the dedicated resource area (e.g., 4 resource blocks in this example) can still be scheduled to R10 UE for use, but in the meanwhile, the two resource blocks included in RBG16 cannot be scheduled to R10 UE.

Step 302: according to the maximum number of bits of the resource allocation field corresponding to the entire carrier and the first number of bits, determining the second number of bits of the resource allocation field corresponding to the dedicated resource area, and then according to the RB number in the dedicated resource area and the second number of bits, determining the RBG size corresponding to the resource allocation type "0" in the dedicated resource area, i.e., the second resource block group size.

Here, when determining the RBG size corresponding to the resource allocation type "0" in the dedicated resource area according to the RBG size corresponding to the common resource area, many factors can be considered, such as, the number $N_{RB}^{NBC\text{-}Part}$ of resource blocks included in the dedicated resource area and the number $N_{RB}^{BC\text{-}Part}$ of resource blocks included in the common resource area, the resource allocation number of bits $\lceil N_{RB}^{BC\text{-}Part}/P \rceil$ required by the common resource area, the maximum number of bits of the resource allocation field corresponding to the entire carrier, the scheduling effectiveness of the resource block group size, and the load of PDCCH resource allocation information bit corresponding to the respective granularity. In this embodiment, the maximum number of bits of the resource allocation field corresponding to the entire carrier is preferable.

As for the resource allocation type "0" and the resource allocation type "1", the number of bits of the resource allocation fields corresponding to various system bandwidths are prescribed in the LTE R8 protocol, as shown in Table 2.

TABLE 2

Relationship between System Bandwidth and Number of bits of Resource Allocation Field

| System Bandwidth (MHz) | Number of Resource Blocks | Number of bits of Resource Allocation Field |
| --- | --- | --- |
| 1.4 | 6 | 6 |
| 3 | 15 | 8 |
| 5 | 25 | 13 |
| 10 | 50 | 17 |
| 15 | 75 | 19 |
| 20 | 100 | 25 |

It can be seen from Table 2 that, with the new carrier structure, the number of bits used in the embodiment of the present invention reuses the number of bits of a resource allocation field corresponding to the original system bandwidth, and is applicable to the variations of combinations of uses of several bandwidths under the new carrier structure. In such way, the number of bits of the resource allocation field in the case where the supported maximum system bandwidth is 20 MHz can be selected to be reused, and then the total number of bits of the resource allocation field corresponding to the entire carrier can be determined. For example, the maximum number of bits is "25". Thus, variations of combinations of uses of various bandwidths under the new carrier structure will not increase the types of the number of bits of the resource allocation field, and thus will not introduce a new information bit length for new schedule signalling (wherein the information bit length for schedule signalling varies with the number of bits of the resource allocation field). Instead, the maximum number of bits is determined according to the RB number included in the dedicated resource area and the common resource area, and the scheduling effectiveness of the resource block group size. As shown in FIG. 5, at step 301, the first number of bits required by the common resource area is determined to be "17", indicating RBG 0 to RBG16.

Here, the RB number included in the RBG indicated by one of the bits in the common resource area may be less than the resource block group size. For example, in FIG. 5, the first resource block group size P in the common resource area is 3, and the number of resource blocks in the last resource block group (i.e. RBG16) in the common resource area is "2" which is less than the first resource block group size (i.e. "3"). The method for calculating the second number of bits and the second resource block group size can be as follows.

As shown in Case 1 of FIG. 5, the last bit (e.g. the 17$^{th}$ bit) in the common resource area indicates RBG16, and it can be determined that the second number of bits equals to the difference between the total number of bits "25" and the first number of bits "17", that is, "8". At this point, a quotient obtained by dividing the number of resource blocks in the dedicated resource area (i.e. "50") by the second number of bits (i.e. "8") is rounded up to get the result of "7". Thus, in Case 1, the second resource block group size (i.e. RBG size) in the dedicated resource area is "7". Then, according to the condition that the RBG size corresponding to the dedicated resource area and the RBG size corresponding to the common resource area has a relationship of being a positive integral multiple, "7" does not satisfy this condition, and thus it can be re-calculated that the second resource block group size in the dedicated resource area is "9". However, this schedule granularity is relatively large, which will affect the accuracy of CQI feedback and scheduling as well as the efficiency of resource usage. Thus, for this case, the second number of bits corresponding to the dedicated resource area can be modified to a value obtained by adding "1" to the difference between the total number of bits "25" and the first number of bits "17", that is, can be increased to "9". At this point, a quotient obtained by dividing the number of resource blocks in the dedicated resource area (i.e. "50") by the second number of bits "9" is rounded up to get the result of "6". The RBG size of "6" satisfies the relationship of being a positive integral multiple of the RBG size corresponding to the common resource area.

As shown in Case 2 of FIG. 5, the 17$^{th}$ bit indicates RBG16', wherein, the RBG16' in Case 2 includes both the common resource area and part of the dedicated resource area. For the base station and terminal of R10 version, the 17$^{th}$ bit corresponding to RBG16 can simultaneously indicate some RBs in the dedicated resource area, and thus the 17$^{th}$ bit is a common bit. At this point, the second number of bits is a value obtained by adding "1" to the difference between the total number of bits "25" of the resource allocation field and the first number of bits "17", that is, "9". Then, the number of resource blocks in the dedicated resource area (i.e. "50") and the number of resource blocks of the last resource block group in the common resource area (i.e. "2") are added together, obtaining the total number of resource blocks after recombination (i.e. "52"). A quotient obtained by dividing the total number of resource blocks after recombination (i.e. "52") by the second number of bits "9" is rounded up to get the result of "6", and thus it is determined that the second source block group size is "6". In the existing LTE system, the existing CQI channel sub-band feedback supports a configuration option in which the number of resource blocks is "6", so the new resource block group size can be well supported, without the need of redefining the size of CQI sub-band feedback due to the new resource block group size.

As shown in Case 3 of FIG. 5, the last bit in the common resource area (i.e. the 17$^{th}$ bit) does not indicate the last resource block group RBG16 in the common resource area, but only indicates the first resource block group RBG16' in the dedicated resource area. At this point, using the same calculation method as in Case 2, it can be obtained that the second number of bits is "9" and the second resource block group size is "6". The RB number of RBG16' can be equal to the difference (i.e. "4") between the second resource block group size in the dedicated resource area (i.e. "6") and the RB number included in the insufficient RBG16 (i.e. "2").

In addition, the RBG size corresponding to the dedicated resource area and the RBG size corresponding to the common resource area can have a certain relationship there between. For example, the RBG size corresponding to the dedicated resource area is a positive integral multiple of the RBG size corresponding to the common resource area, including a case in which the RBG size corresponding to the dedicated resource area is equal to the RBG size corresponding to the common resource area, such as, when the resource allocation type is "0", the RBG size corresponding to the dedicated resource area and the RBG size corresponding to the common resource area are both P, and the RBG size corresponding to the dedicated resource area is N*P, wherein N is an integer larger than "1"; correspondingly, when the resource allocation type is "1", resource block groups in the dedicated resource area and in the common resource area are grouped into P resource block group subsets, wherein a resource block in each resource block group in the common resource area corresponds to an indication for indicating whether or not this resource block is to be scheduled to a user equipment, and N resource blocks in each resource block group in the dedicated resource area correspond to an indication for indicating whether or not the resource blocks are to be scheduled to a user equipment. Then the indication is sent to the user equipment, wherein N is equal to a value obtained by rounding up the ratio of the resource block group size in the dedicated resource area to the resource block group size in the common resource area.

The second resource block group size determined in Case 2 and Case 3 of FIG. 5 is "6" which satisfies the relationship of being a positive integral multiple of the RBG size in the common resource area, and thus, no adjustment is required.

The resource allocation method in this embodiment can be applied to various combinations of different bandwidths of common resource area and dedicated resource area. Operators can make flexible configurations according to frequency spectrum conditions, network structure and service distribution, such as the 13 scenarios shown in the following Table 3. In Table 3, the RBG size in the common resource area (i.e. the first resource block group size) and the RBG size in the dedicated resource area (i.e. the second resource block group size) under each scenario are shown, which preferably do not exceed "6"; in the meanwhile, the number of bits of the resource allocation field eventually obtained under each scenario is the same as the number of bits of the resource allocation field of the first resource allocation type corresponding to the 20 MHz bandwidth of the first system (i.e. the LTE system), such as 25 bits. In such way, the resource allocation number of bits can be kept unchanged under various scenarios and during any possible configuration variation process, which can simplify the processing complexity of the base station and the terminal. The number of bits of the resource allocation field is the same as the number of bits of the resource allocation field used in the scenario where the system bandwidth in the LTE system is 20 MHz, which is the maximum number of bits. In addition, various scenarios can be jointly considered, such that the RBG sizes in the dedicated resource area are the same or have a certain relationship under various scenarios.

TABLE 3

| | Bandwidth of Common Resource Area | Bandwidth of Dedicated Resource Area | First Resource Block Group Size | Second Resource Block Group Size | First Number of bits | Total Number of bits |
| --- | --- | --- | --- | --- | --- | --- |
| Scenario 1 | 15 | 5 | 4 | 4 | 19 | 25 |
| Scenario 2 | 15 | 3 | 4 | 4 | 19 | 25 |
| Scenario 3 | 10 | 10 | 3 | 6 | 17 | 25 |

TABLE 3-continued

|  | Bandwidth of Common Resource Area | Bandwidth of Dedicated Resource Area | First Resource Block Group Size | Second Resource Block Group Size | First Number of bits | Total Number of bits |
|---|---|---|---|---|---|---|
| Scenario 4 | 10 | 5 | 3 | 3 | 17 | 25 |
| Scenario 5 | 10 | 3 | 3 | 3 | 17 | 25 |
| Scenario 6 | 5 | 15 | 2 | 6 | 13 | 25 |
| Scenario 7 | 5 | 10 | 2 | 4 | 13 | 25 |
| Scenario 8 | 5 | 5 | 2 | 2 | 13 | 25 |
| Scenario 9 | 5 | 3 | 2 | 2 | 13 | 25 |
| Scenario 10 | 3 | 15 | 2 | 6 | 8 | 25 |
| Scenario 11 | 3 | 10 | 2 | 4 | 8 | 25 |
| Scenario 12 | 3 | 5 | 2 | 2 | 8 | 25 |
| Scenario 13 | 3 | 3 | 2 | 2 | 8 | 25 |

Step 303: according to the RBG size P corresponding to the common resource area and the RBG size P' corresponding to the dedicated resource area, dividing the carrier into RBGs.

Here, the RB number included in the RBG indicated by one of the bits in the common resource area may be less than the first resource block group size. For example, in Case 1, Case 2 and Case 3 of FIG. 5, the first resource block group size P in the common resource area is 3, the RB number included in RBG16 is "2" which is less than P. According to the calculation result of the second number of bits and the second resource block group size calculated in step 302: in Case 1, the serial numbers of the two RBs of RBG16 in the common resource area indicated by the 17$^{th}$ bit are RB48 and RB49 respectively; in Case 2, the serial numbers of the last two RBs in the common resource area are RB48 and RB49 respectively, and the serial numbers of the four RBs in the dedicated resource area that are consecutively numbered with RB48 and RB49 are respectively RB50, RB51, RB52, and RB53, then these 6 RBs can be combined into one resource block group RBG16' indicated by the 17$^{th}$ bit, and RBG16' is allocated to the R10 version terminal; in Case 3, for the base station and the terminal of R10 version, the 17$^{th}$ bit corresponding to RBG16' only indicates the inclusion of four RBs in the dedicated resource area (including RB50, RB51, RB52, and RB53), but does not include the remaining RBs (i.e. RB48 and RB49) in the common resource area. The serial numbers of RBGs consisting of other RBs in the dedicated resource area are respectively RBG17, . . . , and RBG24. In this embodiment, the number of bits of the resource allocation field corresponding to the entire carrier is "25". In addition, as for the 13 scenarios of Table 3, according to the RBG size P in the common resource area and the RBG size P' in the dedicated resource area determined in the above way, the carrier can be divided into RBGs, and then the numbers of resource block groups respectively corresponding to the common resource area and the dedicated resource area can be determined. Finally, the number of bits of the resource allocation field can be less than or equal to "25". For example, when it is less than "25", it can be further filled to be "25", wherein the filling bits can all be set as "0" or "1", or can be a sequence known to the base station and the terminal through negotiation in advance.

Figure 6:
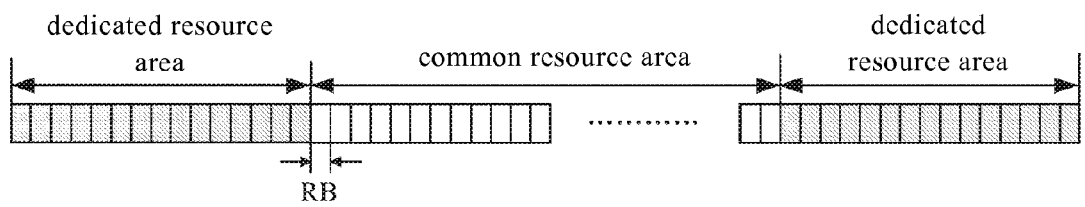
FIG. 6 is a schematic view of inconsecutive resource blocks in the second embodiment of the resource allocation method of the present invention.

Furthermore, the carrier structure of this embodiment not only can include a dedicated resource area consisting of several consecutive resource blocks, but also can include a plurality of dedicated resource areas consisting of several inconsecutive resource blocks. This resource allocation method is also applicable to a case in which there are multiple dedicated resource areas for one carrier structure. As show in FIG. 6, it is a schematic view of inconsecutive resource blocks in the second embodiment of the resource allocation method of the present invention. Two or more dedicated resource areas can be logically considered as one dedicated resource area. When determining the RBG size in the dedicated resource area according to the resource allocation method of this embodiment, the RBG sizes of the two or more dedicated resource areas can be determined respectively. The RBG sizes of the two or more dedicated resource areas can even be not completely the same, and the present invention is not limited to any specific methods.

Different versions of terminals in this embodiment have the same RBG size in the common resource area, and the RBG size in the dedicated resource area can be determined according to the RBG size in the common resource area and the maximum number of bits of the resource allocation field of the carrier. Since the carrier supporting different versions of terminal systems has the same RBG size in the common resource area, the process for the base station to schedule PDCCH and PDSCH for different versions of terminals can be simplified, repeated resource allocation can be reduced, and thus bandwidth resource can be saved.

Figure 7:
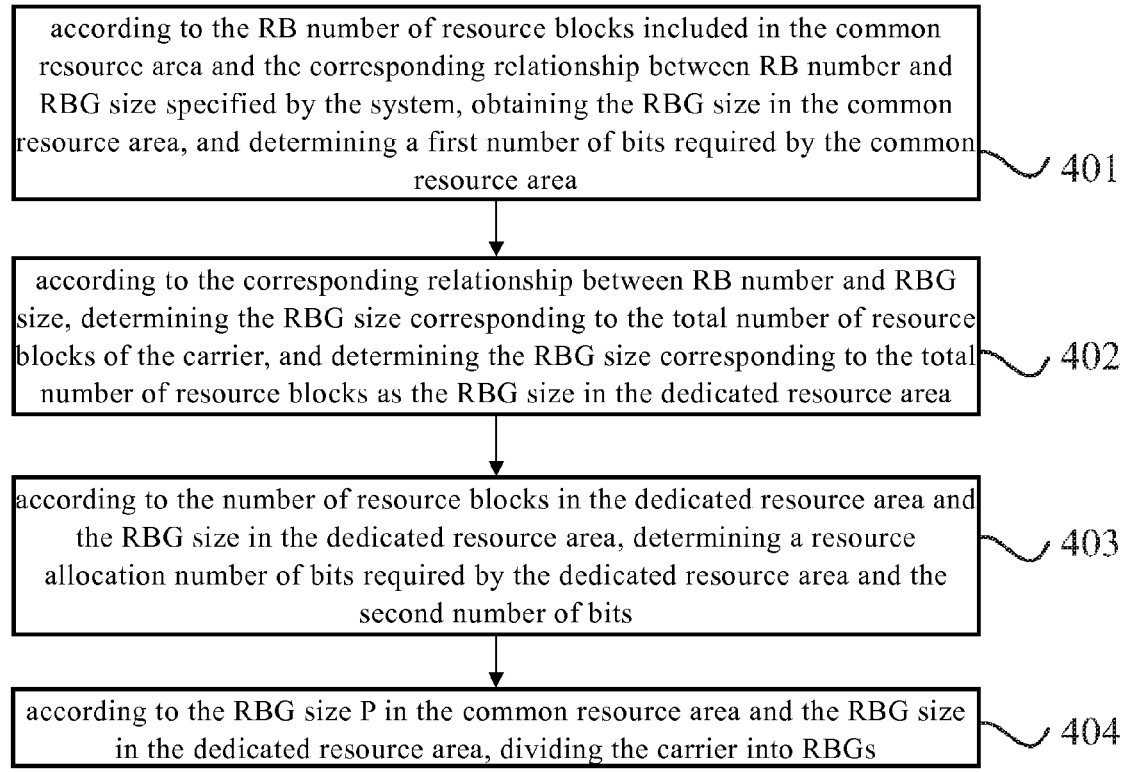
FIG. 7 is a schematic view of a third embodiment of the resource allocation method of the present invention.

FIG. 7 is a schematic view of the third embodiment of the resource allocation method of the present invention. As shown in FIG. 7, this resource allocation method comprises the following steps.

Step 401: according to the RB number $N_{RB}^{BC-Part}$ included in the common resource area as well as the corresponding relationship between RB number and RBG size specified by the system in Table 1, the RBG size P in the common resource area is obtained, and the resource allocation number of bits required by the common resource area (i.e., the first number of bits) is determined as $\lceil N_{RB}^{BC-Part}/P \rceil$.

Step 402: the total number of resource blocks in the common resource area and in the dedicated resource area (i.e. the total number of resource blocks of the carrier) is $M=N_{RB}^{BC-Part}+N_{RB}^{NBC-Part}$, wherein, $N_{RB}^{BC-Part}$ is the RB number included in the common resource area, $N_{RB}^{NBC-Part}$ is the RB number included in the dedicated resource area. Then according to the corresponding relationship between RB number and RBG size in Table 1, the RBG size P' corresponding to the total number M of resource blocks of the carrier is determined, and the RBG size P' corresponding to the total number of resource blocks is determined as the RBG size in the dedicated resource area.

Step 403: according to the number $N_{RB}^{NBC-Part}$ of resource blocks in the dedicated resource area and the RBG size P' in the dedicated resource area, the resource allocation number of bits required by the dedicated resource area as the second number of bits is determined as $\lceil N_{RB}^{NBC-Part}/P' \rceil$.

Step 404: according to the RBG size P in the common resource area and the RBG size P' in the dedicated resource area, the carrier is divided into RBGs. As for the specific method, reference can be made to the relevant description of step 303 in the above embodiment.

Different versions of terminals in this embodiment have the same RBG size in the common resource area, and according to the total number of resource blocks of the carrier, RBG size in the dedicated resource area can be determined. Since the carrier supporting different versions of terminal systems has the same RBG size in the common resource area, process for the base station to schedule PDCCH and PDSCH of different versions of terminals can be simplified, repeated bandwidth resource allocation can be reduced, and thus bandwidth resource can be saved.

Figure 8:
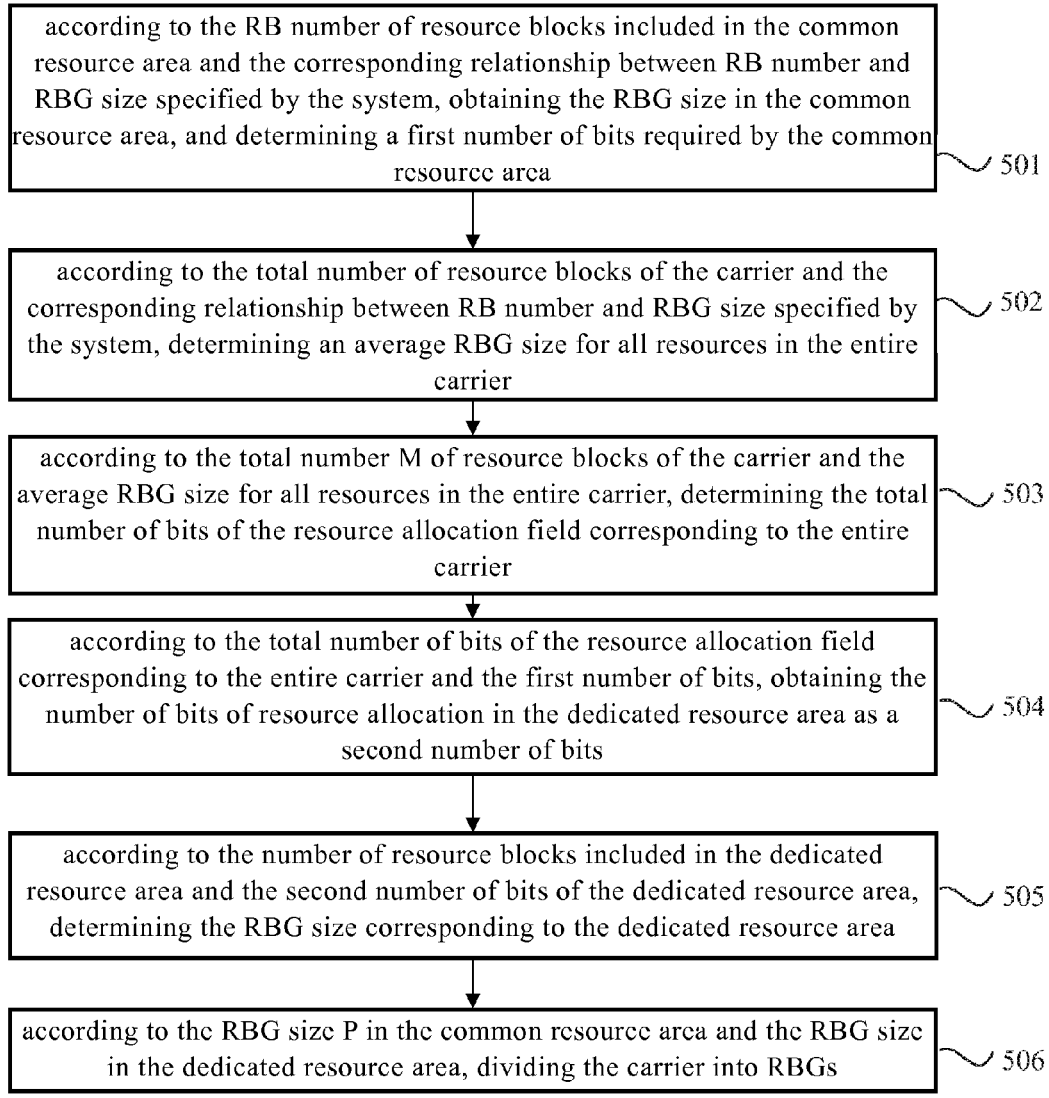
FIG. 8 is a schematic view of a fourth embodiment of the resource allocation method of the present invention.

FIG. 8 is a schematic view of the fourth embodiment of the resource allocation method of the present invention. As shown in FIG. 8, this resource allocation method comprises the following steps:

Step 501: according to the RB number $N_{RB}^{BC\text{-}Part}$ included in the common resource area as well as the corresponding relationship between RB number and RBG size specified by the system in Table 1, the RBG size P in the common resource area is obtained, and the resource allocation number of bits required by the common resource area (i.e., the first number of bits) is determined as $\lceil N_{RB}^{BC\text{-}Part}/P \rceil$.

Step 502: according to the total number M of resource blocks of the carrier as well as the corresponding relationship between RB number and RBG size specified by the system in Table 1, the average RBG size P' for all the resources in the entire carrier is determined. Here, the total number of resource blocks in the common resource area and in the dedicated resource area (i.e. the total number of resource blocks of the carrier) is $M = N_{RB}^{BC\text{-}Part} + N_{RB}^{NBC\text{-}Part}$, wherein $N_{RB}^{BC\text{-}Part}$ is the RB number included in the common resource area, and $N_{RB}^{NBC\text{-}Part}$ is the RB number included in the dedicated resource area.

Step 503: according to the total number M of resource blocks of the carrier and the average RBG size P' for all the resources in the entire carrier, the total number of bits of the resource allocation field corresponding to the entire carrier is determined as $\lceil M/P' \rceil$.

Step 504: according to the total number of bits of the resource allocation field corresponding to the entire carrier and the first number of bits, the resource allocation number of bits in the dedicated resource area (i.e., the second number of bits) is obtained as $\lceil M/P' \rceil - \lceil N_{RB}^{BC\text{-}Part}/P \rceil$.

Step 505: according to the number $N_{RB}^{NBC\text{-}Part}$ of resource blocks included in the dedicated resource area and the second number of bits for the dedicated resource area, the RBG size in the dedicated resource area is determined as $\lceil N_{RB}^{NBC\text{-}Part}/(\lceil M/P' \rceil - \lceil N_{RB}^{BC\text{-}Part}/P \rceil)$.

Step 506: according to the RBG size P in the common resource area and the RBG size $\lceil N_{RB}^{NBC\text{-}Part}/(\lceil M/P' \rceil - \lceil N_{RB}^{BC\text{-}Part}/P \rceil) \rceil$ in the dedicated resource area, the carrier is divided into RBGs. As for the specific method, reference can be made to the relevant description of step 303 in the above embodiment.

For the new version terminal, such as R10 UE and the subsequent version UE, this embodiment can support free carrier bandwidth, and can configure the number of resource blocks in the common resource area and the number of resource blocks in the dedicated resource area according to different numbers of old version terminals and new version terminals. For different versions of terminals, the same resource block group size is adopted in the common resource area, and thus resource allocation for two versions of terminals can be supported on the same carrier, which has a good backwards compatibility. Furthermore, with the compatibility with backwards system satisfied, the resource block group size in the dedicated resource area can be reset, thereby reducing the overhead of control signalling and enabling a certain flexibility and freedom for the resource allocation. Moreover, by reusing downlink control indication format length in the backwards system, this resource allocation method can be implemented without introducing any new formats.

In this embodiment, different versions of terminals have the same RBG size in the common resource area, and according to the total number of resource blocks of the carrier, the total number of bits of the resource allocation field corresponding to the entire carrier can be determined, and further the RBG size in the dedicated resource area can be determined. Since the carrier supporting different versions of terminal systems has the same RBG size in the common resource area, process for the base station to schedule PDCCH and PDSCH of different versions of terminals can be simplified, repeated bandwidth resource allocation can be reduced, and bandwidth resource can be saved.

Figure 9:
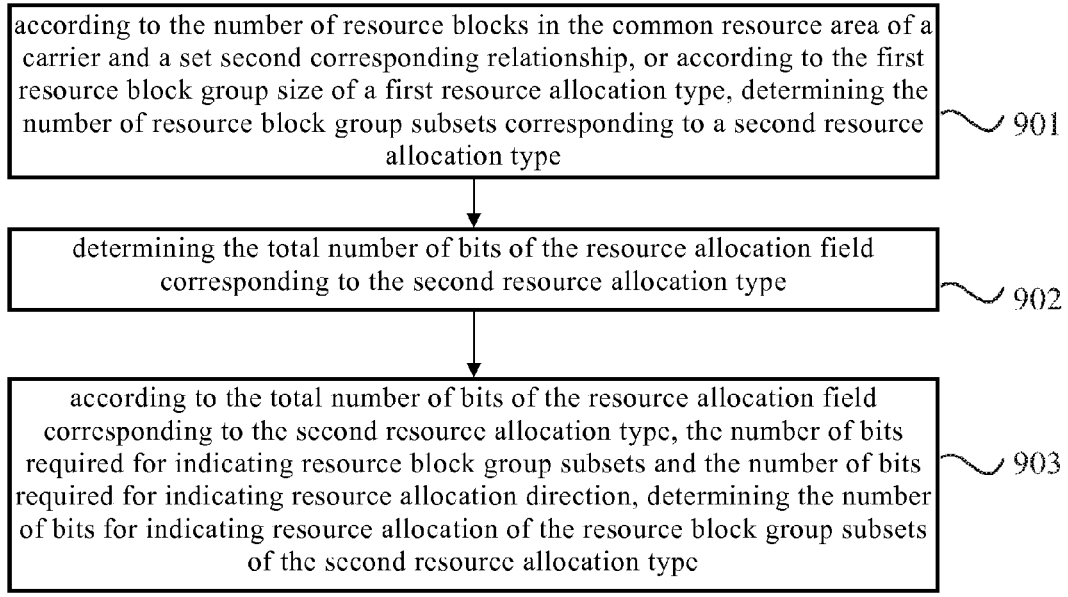
FIG. 9 is a schematic view of a fifth embodiment of the resource allocation method of the present invention.

FIG. 9 is a flowchart of the fifth embodiment of the resource allocation method of the present invention. As shown in FIG. 9, in this embodiment, by taking the second resource allocation type (e.g. resource allocation type "1") as an example, the resource allocation method can comprise the following steps:

Step 901: according to the number of resource blocks in the common resource area of the carrier and a set second corresponding relationship, or according to the first resource block group size of the first resource allocation type, the number of resource block group subsets corresponding to the second resource allocation type is determined, wherein the carrier includes common resource area and dedicated resource area, and the second corresponding relationship is a corresponding relationship between the number of resource blocks and the number of resource block group subsets. The resource block groups of the carrier are allocated into the resource block group subsets.

Here, as for the method of forming resource block groups of the second resource allocation type corresponding to the carrier, reference can be made to any methods of forming resource block groups of the first resource allocation type as set forth in the above embodiments. In particular, as for the method of determining the size of resource block groups in the common resource area, reference can be made to any methods of determining the first resource block group size of the first resource allocation type as set forth in the above embodiments of the present invention; as for the method of determining the size of resource block groups in the dedicated resource area, reference can be made to any methods of determining the second resource block group size of the first resource allocation type set forth in the above embodiments of the present invention. Of course, forming resource block groups of the second resource allocation type can be carried out by utilizing other methods.

Referring to Table 1 in the first embodiment of the resource allocation method of the present invention, the second corresponding relationship in step 901 can be obtained as in the following Table 4.

TABLE 4

Corresponding relationship between the Number of Resource
Blocks and the Number of Resource Block Group Subsets

| Number of Resource Blocks | Number of Resource Block Group Subsets |
|---|---|
| ≤10 | 1 |
| 11-26 | 2 |
| 27-63 | 3 |
| 64-110 | 4 |

Step 902: determining the total number of bits of the resource allocation field corresponding to the second resource allocation type.

Here, step 902 can comprise the following two examples.

Example 1: according to the total number of resource blocks included in the carrier as well as the first corresponding relationship, determining the total number of bits of the resource allocation field of the second resource allocation type corresponding to the carrier;

Example 2: determining that the total number of bits of the resource allocation field corresponding to the second resource allocation type is equal to the total number of bits of the resource allocation field corresponding to the first resource allocation type.

In LTE system, in the case of the same bandwidth system, the number of bits of the resource allocation field occupied by the resource allocation type "1" and the number of bits of the resource allocation field occupied by the resource allocation type "0" can be the same, and can also be indicated in a bitmap manner. Thus, the total number of bits of the resource allocation field corresponding to the second resource allocation type can be equal to the total number of bits of the resource allocation field corresponding to the first resource allocation type. In addition, in LTE system, in order to distinguish specific resource allocation types, information of one bit is included in the indication signalling of resource allocation for indicating the resource allocation type.

In addition, it is also possible that, according to the maximum number of bits of the resource allocation field corresponding to the carrier, or according to the total number of resource blocks included in the carrier as well as the corresponding relationship between the number of resource blocks and the resource block group size, the total number of bits of the resource allocation field of the second resource allocation type corresponding to the carrier can be determined, and then, according to the total number of bits of the second resource allocation type, the total number of bits of the first resource allocation type is determined. Alternatively, the total number of bits of the first resource allocation type and the total number of bits of the second resource allocation type can be determined respectively, and eventually, it is still possible to keep the total number of bits of the resource allocation field corresponding to the first resource type and that corresponding to the second resource type the same, for example, by filling the resource allocation field of one of the two resource allocation types that has less total number of bits, until the two have the same total number of bits.

Step 903: according to the total number of bits of the resource allocation field corresponding to the second resource allocation type, the number of bits required for indicating resource block group subsets, and the number of bits required for indicating resource allocation direction, the number of bits for indicating resource allocation of resource block group subsets of the second resource allocation type is determined. According to the number of bits indicating resource allocation of resource block group subsets, an indication whether or not resource blocks in each resource block group subset is to be scheduled to a user equipment is determined, and this indication is sent to the user equipment.

Specifically, the method at step 903, that is, according to the total number of bits of the resource allocation field corresponding to the second resource allocation type, the number of bits required for indicating resource block group subsets, and the number of bits required for indicating resource allocation direction, determining the number of bits for indicating resource allocation of resource block group subsets of the second resource allocation type, can be as follows: determining that the number of bits indicating resource allocation of e resource block group subsets of the second resource allocation type is equal to the value obtained by subtracting the number of bits required for indicating resource block group subsets and the number of bits required for indicating resource allocation direction from the total number of bits of the resource allocation field corresponding to the second resource allocation type.

The method at step 903, that is, according to the number of bits indicating resource allocation of resource block group subsets, determining the indication whether or not resource blocks in each resource block group subset is to be scheduled to a user equipment, can be as follows: according to the number of bits indicating resource allocation of resource block group subsets, determining that a resource block in each resource block group in the common resource area corresponds to an indication for indicating whether or not this resource block is to be scheduled to a user equipment; and the N resource blocks in the dedicated resource area correspond to an indication for indicating whether or not the resource blocks are to be scheduled to a user equipment, wherein, N is equal to a value obtained by rounding up a ratio of the resource block group size in the dedicated resource area to the resource block group size in the common resource area. Here, $\lceil \log_2 (P) \rceil$ bits are required for indicating resource block group subsets, P is the number of resource block group subsets; and one bit is required for indicating resource allocation direction in the resource block group subset, such as, from left to right or from right to left.

Figure 10:
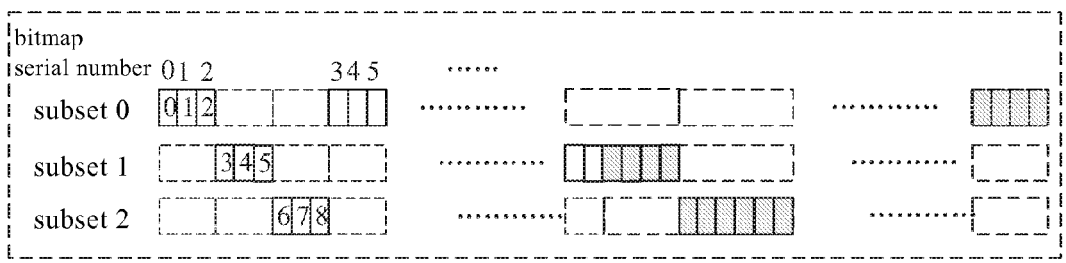
FIG. 10 is a schematic view of a resource allocation type "1" in the fifth embodiment of the resource allocation method of the present invention.

As shown in FIG. 10, it is a schematic view of the resource allocation type "1" in the fifth embodiment of the resource allocation method of the present invention. As compared with the resource allocation type "0" involved in FIG. 5, the resource allocation type "1" can divide RBGs into P RBG subsets according to the common resource area of the system bandwidth, wherein P can be determined according to the number of resource blocks in the common resource area and Table 4, or can be equal to the first resource block group size in the common resource for the resource allocation type "0". If the number of resource blocks included in each RBG in the common resource area for the resource allocation type "0" is P, the resource allocation type "1" also divides the RBGs into P RBG subsets. $\lceil \log_2 (P) \rceil$ bits are required for indicating which resource block group subset of the resource allocation type "1" the scheduled resource of the terminal belongs to. For example, when P=3, $\lceil \log_2 (P) \rceil$ is "2". Besides, an additional bit is required for indicating the starting direction of the resource allocation of the resource allocation type "1", that is, whether starting from the left or starting from the right to indicate resource allocation. FIG. 10 takes a method of starting the indication from the left as an example for description. The number of bits that indicates the RBs to be scheduled for the resource allocation type "1" is $N_{RB}^{TYPE1}=25-\lceil \log_2 (P) \rceil -1=22$, and thus, resource blocks included in at least three RBGs cannot be indicated, i.e. the RBGs represented by dashed boxes in FIG. 10. For common resource area, each bit indicates whether or not one RB within one resource block group is allocated. For example, assuming that the number of bits indicates the RBs to be scheduled for the resource allocation type "1" is "22", then for the first resource block group subset, if the correspondingly allocated RB number is "17" in the common resource area, 17 bits are required for indicating the RBs of the common resource area of this resource block group subset. However, for the dedicated resource area, each bit may indicate whether or not N resource blocks included in one resource block group are allocated, in which the N resource blocks can be N resource blocks consecutive in a frequency domain within one resource block group (i.e. N resource blocks with consecutive resource block serial numbers), or can be N resource blocks spaced at an equal frequency within one resource block group (i.e. N resource blocks with inconsecutive resource block serial numbers that are spaced at an equal interval), or can be determined according to other predefined rules, and the present invention is not limited to any particular ways. The method for determining N is as follows: if the resource block group size in the dedicated resource area is "6" and the resource block group size in the common resource area is "3", then N is "6/3=2".

This embodiment can determine the number of resource block group subsets corresponding to the second resource allocation type according to the number of resource blocks in the common resource area. Since the carrier supporting different versions of terminal systems has the same number of resource block group subsets, scheduling process can be simplified, repeated resource allocation can be reduced, and bandwidth resource can be saved.

Figure 11:
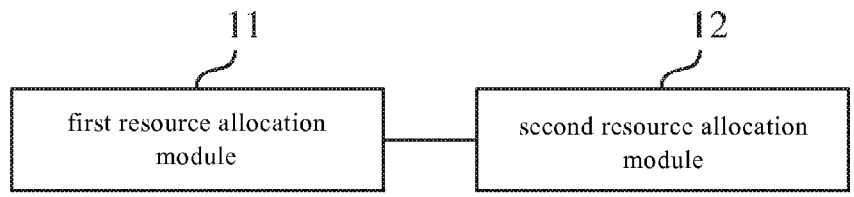
FIG. 11 is a schematic view of the structure of a first embodiment of the resource allocation apparatus of the present invention.

FIG. 11 is a schematic view of the structure of the first embodiment of the resource allocation apparatus of the present invention. As shown in FIG. 11, the resource allocation apparatus comprises a first resource allocation module 11 and a second resource allocation module 12.

The first resource allocation module 11 is used for: according to the number of resource blocks in a common resource area of a carrier and a set first corresponding relationship, determining a first resource block group size corresponding to a first resource allocation type in the common resource area, the first corresponding relationship is corresponding relationship between the number of resource blocks and the resource block group size; and according to the first resource block group size, dividing all resource blocks in the common resource area of the carrier into one or more resource block groups, the carrier including the common resource area and a dedicated resource area.

The second resource allocation module 12 is used for: according to the first resource block group size determined by the first resource allocation module 11, or according to the total number of resource blocks of the carrier and the first corresponding relationship, determining a second resource block group size corresponding to the first resource allocation type in the dedicated resource area, and according to the second resource block group size, dividing resource blocks in the dedicated resource area of the carrier into one or more resource block groups, each resource block group corresponding to an indication for indicating whether or not the resource block group is to be scheduled to a user equipment, and then sending the indication to the user equipment.

In particular, a carrier can include a common resource area and a dedicated resource area, wherein the common resource area is a bandwidth resource area that can be used by both the terminal of the first system and the terminal of the second system, wherein the second system is an evolved system of the first system. The dedicated resource area is a bandwidth resource area that can be used by the terminal of the second system but cannot be used by the terminal of the first system. Taking a case in which the first system is LTE system and the second system is LTE evolved system as an example, the terminal of the first system can be R8/R9 UE while the terminal of the second system can be a new version terminal such as R10 UE. Under the new carrier structure, the bandwidth resource area that can be used by both R8/R9 UE and R10 UE is the common resource area while the bandwidth resource area that can be used only by the R10 UE is the dedicated resource area. LTE system can have a plurality of resource allocation types, and in the embodiments of the present invention, it is assumed that the first resource allocation type is resource allocation type "0". After the first resource allocation module 11 determines the first resource block group size corresponding to the first resource allocation type in the common resource area according to the number of resource blocks in the common resource area of the carrier and the first corresponding relationship set by the system in advance, all resource blocks in the common resource area of the carrier are divided into one or more resource block groups according to the first resource block group size. The second resource allocation module 12 can determine the second resource block group size corresponding to the first resource allocation type in the dedicated resource area according to the first resource block group size, like Way 1 in the first embodiment of the resource allocation method. Alternatively, the second resource allocation module 12 can determine the second resource block group size corresponding to the first resource allocation type in the dedicated resource area according to the total number of resource blocks of the carrier and the first corresponding relationship, like Way 2 in the first embodiment of the resource allocation method. Then the second resource allocation module 12 can divide all resource blocks in the dedicated resource area of the carrier into one or more resource block groups according to the second resource block group size, each resource block group corresponding to an indication for indicating whether or not this resource block group is to be scheduled to a user equipment, and this indication is sent to the user equipment.

In this embodiment, the first resource allocation module can determine the first resource block group size in the common resource area, and the second resource allocation module can determine the second resource block group size in the dedicated resource area according to the first resource block group size or according to the total number of resource blocks of the carrier as well as the corresponding relationship between the number of resource blocks and the resource block group size. Since the resource block groups have the same size in the common resource area, scheduling process can be simplified, repeated resource allocation can be reduced, and bandwidth resource can be saved.

As for the structure and relevant functions of this resource allocation apparatus, reference can be made to the description of the foregoing method embodiment and thus details thereof are omitted.

Figure 12:
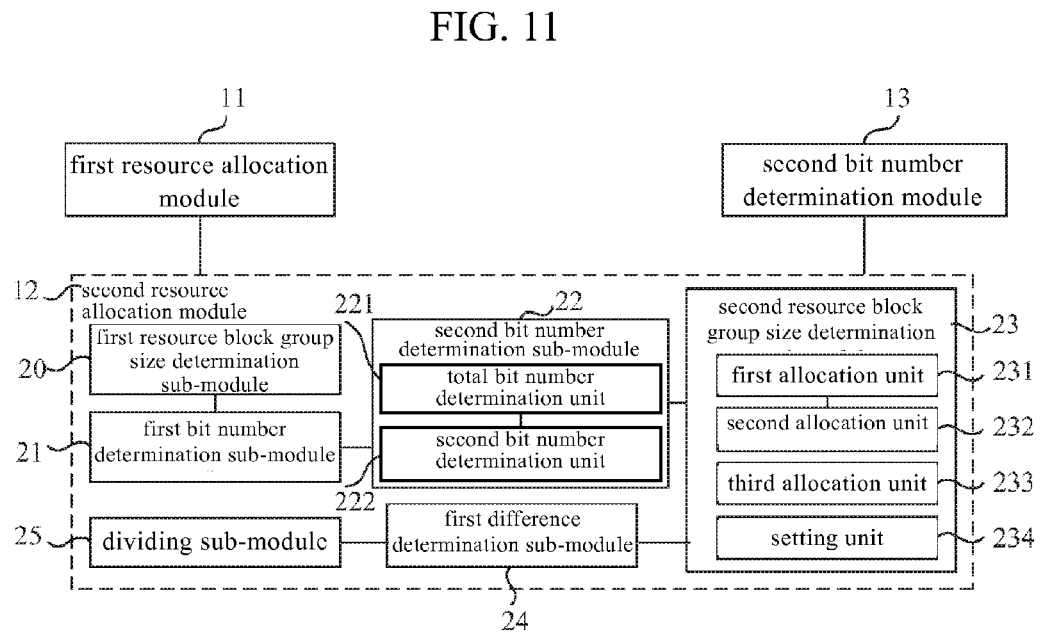
FIG. 12 is a schematic view of the structure of a second embodiment of the resource allocation apparatus of the present invention.

FIG. 12 is a schematic view of the structure of the second embodiment of the resource allocation apparatus of the present invention. As shown in FIG. 12, on the basis of the first embodiment of the resource allocation apparatus of the present invention, the second resource allocation module 12 can comprise a first resource block group size determination sub-module 20, the first number of bits determination sub-module 21, the second number of bits determination sub-module 22 and a second resource block group size determination sub-module 23.

The first resource block group size determination submodule 20 is used for: according to the number of resource blocks in the common resource area and the first resource block group size, determining the number of resource block groups in the common resource area.

The first number of bits determination sub-module 21 is used for: according to the number of resource block groups in the common resource area determined by the first resource block group size determination sub-module 20, determining the first number of bits of the resource allocation field for indicating the common resource area;

The second number of bits determination sub-module 22 is used for: according to the first number of bits determined by the first number of bits determination sub-module 21, determining the second number of bits of the resource allocation field for indicating the dedicated resource area.

The second resource block group size determination sub-module 23 is used for: according to the number of resource blocks in the dedicated resource area and the second number of bits determined by the second number of bits determination sub-module 22, determining the second resource block group size.

Further, the second number of bits determination sub-module 22 can comprise the total number of bits determination unit 221 and the second number of bits determination unit 222.

The total number of bits determination unit 221 is used for: according to the maximum number of bits of the resource allocation field corresponding to the carrier, or according to the total number of resource blocks included in the carrier and the corresponding relationship between the number of resource blocks and the resource block group size, determining the total number of bits of the resource allocation filed corresponding to the carrier.

The second number of bits determination unit 222 is used for: according to the total number of bits of the resource allocation field determined by the total number of bits determination unit 221 and the first number of bits, determining the second number of bits.

In addition, the second resource block group size determination sub-module 23 can comprise one or more of a first allocation unit 231, a second allocation unit 232, and a third allocation unit 233.

The first allocation unit 231 is used for: if the number of resource blocks of the last resource block group in the common resource area is equal to the first resource block group size, rounding up the quotient obtained by dividing the number of resource blocks in the dedicated resource area by the second number of bits to get a first ratio; if the first ratio is a positive integral multiple of the first resource block group size, determining the first ratio as the second resource block group size; or, if the first ratio is not a positive integral multiple of the first resource block group size, determining a minimum integer larger than the first ratio and equal to a positive integral multiple of the first resource block group size as the second resource block group size.

The second allocation unit 232 is used for: if the number of resource blocks of the last resource block group in the common resource area is less than the first resource block group size, adding the number of resource blocks in the dedicated resource area and the number of resource blocks of the last resource block group in the common resource area, thereby obtaining a first total, and then rounding up the quotient obtained by dividing the first total by the second number of bits to get a first ratio; if the first ratio is a positive integral multiple of the first resource block group size, determining the first ratio as the second resource block group size; or, if the first ratio is not a positive integral multiple of the first resource block group size, determining a minimum integer larger than the first ratio and equal to a positive integral multiple of the first resource block group size as the second resource block group size.

The third allocation unit 233 is used for: if the number of resource blocks of the last resource block group in the common resource area is less than the first resource block group size, rounding up the quotient obtained by dividing the number of resource blocks in the dedicated resource area by the second number of bits to get a first ratio; if the first ratio is a positive integral multiple of the first resource block group size, determining the first ratio as the second resource block group size; or, if the first ratio is not a positive integral multiple of the first resource block group size, determining a minimum integer larger than the first ratio and equal to a positive integral multiple of the first resource block group size as the second resource block group size.

Further, the second resource block group size determination sub-module 23 can comprise a setting unit 234, which is used for: if the second resource block group size is larger than a set value, replacing the second resource block group size with the set value.

In particular, after the first resource block group size determination sub-module 20 determines the number of resource block groups in the common resource area according to the number of resource blocks in the common resource area and the first resource block group size, the first number of bits determination sub-module 21 determines the first number of bits of the resource allocation field for indicating the common resource area according to the number of resource block groups in the common resource area. Then, the total number of bits determination unit 221 can determine the total number of bits of the resource allocation field corresponding to the carrier according to the maximum number of bits of the resource allocation field corresponding to the carrier, or can determine the total number of bits of the resource allocation field corresponding to the carrier according to the total number of resource blocks included in the carrier as well as the corresponding relationship between the number of resource blocks and the resource block group size. The second number of bits determination unit 222 determines the second number of bits according to the total number of bits of the resource allocation field and the first number of bits. If the number of resource blocks of the last resource block group in the common resource area is equal to the first resource block group size, the first allocation unit 231 rounds up the quotient obtained by dividing the number of resource blocks in the dedicated resource area by the second number of bits to get a first ratio. Then, the first ratio is compared with the first resource block group size. If the first ratio is a positive integral multiple of the first resource block group size, the first ratio is determined as the second resource block group size; or, if the first ratio is not a positive integral multiple of the first resource block group size, a minimum integer larger than the first ratio and equal to a positive integral multiple of the first resource block group size is determined as the second resource block group size. If the number of resource blocks of the last resource block group in the common resource area is less than the first resource block group size, the second allocation unit 232 adds the number of resource blocks in the dedicated resource area and the number of resource blocks of the last resource block group in the common resource area to get the total number of resource blocks, and then rounds up the quotient obtained by dividing the total number of resource blocks by the second number of bits to get a first ratio. Then, this first ratio is compared with the first resource block group size. If the first ratio is a positive integral multiple of the first resource block group size, the first ratio is determined as the second resource block group size; or, if the first ratio is not a positive integral multiple of the first resource block group size, a minimum integer larger than the first ratio and equal to a positive integral multiple of the first resource block group size is determined as the second resource block group size. If the number of resource blocks of the last resource block group in the common resource area is less than the first resource block group size, the third allocation unit 233 rounds up the quotient obtained by dividing the number of resource blocks in the dedicated resource area by the second number of bits to get a first ratio. If the first ratio is a positive integral multiple of the first resource block group size, the first ratio is determined as the second resource block group size; if the first ratio is not a positive integral multiple of the first resource block group size, a minimum integer larger than the first ratio and equal to a positive integral multiple of the first resource block group size is determined as the second resource block group size. In addition, a value can be preset for the second resource block group size, such as "6". If the second resource block group size is larger than the set value, the setting unit 234 replaces the second resource block group size with the set value, i.e., using "6" as the second resource block group size.

Further, in the process of dividing all resource blocks in the dedicated resource area of the carrier into one or more resource block groups according to the second resource block group size, it is necessary to allocate the resource blocks in the contiguous portions of the common resource area and the dedicated resource area. Thus, the second resource allocation module 12 can further comprise a first difference determination sub-module 24 and a dividing sub-module 25.

The first difference determination sub-module 24 is used for: if the number of resource blocks of the last resource block group in the common resource area is less than the first resource block group size, calculating a difference between the second resource block group size and the number of resource blocks of the last resource block group in the common resource area as a first difference.

The dividing sub-module 25 is used for: grouping the resource blocks of the last resource block group in the common resource area and the resource blocks of a number equal to the first difference in the dedicated resource area that are adjacent to the common resource area in serial number into the first resource block group in the dedicated resource area; or, grouping the resource blocks of a number equal to the first difference in the dedicated resource area that are adjacent to the common resource area in serial number into the first resource block group in the dedicated resource area.

As for the specific method for the first difference determination sub-module and the dividing sub-module to allocate resource blocks in the contiguous portions of the common resource area and the dedicated resource area, reference can be made to the relevant description of the first embodiment and the second embodiment of the resource allocation method of the present invention and FIG. 5.

In addition, the resource allocation apparatus can further comprise any of the following modules:

a second number of bits determination module 13, which is used for: after determining the second resource block group size corresponding to the first resource allocation type in the dedicated resource area by the second resource allocation module 12 according to the total number of resource blocks of the carrier as well as the corresponding relationship between the number of resource blocks and the resource block group size, according to the number of resource blocks in the dedicated resource area and the second resource block group size, determining the number of resource block groups in the dedicated resource area; and according to the number of resource block groups in the dedicated resource area, determining the second number of bits of the resource allocation field for indicating the dedicated resource area. As for the specific method, reference can be made to the relevant description of Way 2 in the first embodiment of the resource allocation method of the present invention.

In this embodiment, the first resource allocation module can determine the first resource block group size in the common resource area, and the second resource allocation module can determine the second resource block group size in the dedicated resource area according to the first resource block group size or according to the total number of resource blocks of the carrier as well as the corresponding relationship between the number of resource blocks and the resource block group size. Since the carrier supporting different versions of terminal systems has the same resource block group size in the common resource area, scheduling process can be simplified, repeated resource allocation can be reduced, and bandwidth resource can be saved.

As for the structure and relevant functions of this resource allocation apparatus, reference can be made to the description of the foregoing method embodiment and thus details thereof are omitted.

Figure 13:
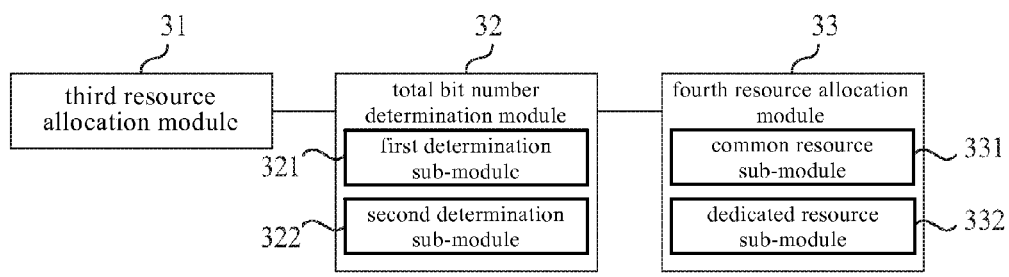
FIG. 13 is a schematic view of the structure of a third embodiment of the resource allocation apparatus of the present invention.

FIG. 13 is a schematic view of the structure of the third embodiment of the resource allocation apparatus. As shown in FIG. 13, the resource allocation apparatus comprises:

a third resource allocation module 31, which is used for: according to the number of resource blocks in a common resource area of a carrier and a set second corresponding relationship, or according to a first resource block group size of a first resource allocation type, determining the number of resource block group subsets corresponding to a second resource allocation type, the carrier including the common resource area and a dedicated resource area, and the second corresponding relationship being a corresponding relationship between the number of resource blocks and the number of resource block group subsets; and allocating resource block groups of the carrier into the resource block group subsets;

a total number of bits determination module 32, which is used for determining the total number of bits of the resource allocation field corresponding to the second resource allocation type; and a fourth resource allocation module 33, which is used for: according to the total number of bits of the resource allocation field corresponding to the second resource allocation type determined by the total number of bits determination module 32, the number of bits required for indicating the resource block group subsets, and the number of bits required for indicating the resource allocation direction, determining the number of bits for indicating resource allocation of the resource block group subsets of the second resource allocation type; according to the number of bits for the resource allocation of the resource block group subsets, determining an indication that indicates whether or not resource blocks in each resource block group subset are to be scheduled to a user equipment, and then sending the indication to the user equipment.

In particular, a carrier can include a common resource area and a dedicated resource area, wherein the common resource area is a bandwidth resource area that can be used by both the terminal of the first system and the terminal of the second system, the second system being an evolved system of the first system. The dedicated resource area is a bandwidth resource area that can be used by the terminal of the second system but cannot be used by the terminal of the first system. Taking a case in which the first system is LTE system and the second system is LTE evolved system as an example, the terminal of the first system can be R8/R9 UE while the terminal of the second system can be a new version terminal such as R10 UE. With the new carrier structure, the bandwidth resource area that can be used by both R8/R9 UE and R10 UE is the common resource area, while the bandwidth resource area that can be used only by the R10 UE is the dedicated resource area. LTE system can have a plurality of resource allocation types, and in the embodiments of the present invention, it is assumed that the second resource allocation type is resource allocation type "1". The third resource allocation module 31 can determine the number of resource block group subsets corresponding to the second resource allocation type according to the number of resource blocks in the common resource area of the carrier and the set second corresponding relationship. Alternatively, the third resource allocation module 31 can determine the number of resource block group subsets corresponding to the second resource allocation type according to the first resource block group size of the first resource allocation type. Then, the third resource allocation module 31 can allocate the resource blocks of the carrier into the resource block group subsets, and as for the specific method thereof, reference can be made to the relevant description of the fifth embodiment of the resource allocation method of the present invention and FIG. 10. After the total number of bits determination module 32 determines the total number of bits of the resource allocation field corresponding to the second resource allocation type, the fourth resource allocation module 33 can subtract the number of bits required for indicating the resource block subsets and the number of bits required for indicating the resource allocation direction from the total number of bits of the resource allocation field corresponding to the second resource allocation type. The resulted value serves as the number of bits for indicating resource allocation of the resource block group subsets of the second resource allocation type, wherein, a resource block of the resource block group subsets in the common resource area correspond to an indication that indicates whether or not the resource block is to be scheduled to a user equipment. Then this indication is sent to the user equipment.

Further, the total number of bits determination module 32 can comprise a first determination sub-module 321 or a second determination sub-module 322.

The first determination sub-module 321 is used for: according to the total number of resource blocks included in the carrier and the second corresponding relationship, determining the total number of bits of the resource allocation field corresponding to the second resource allocation type of the carrier.

The second determination sub-module 322 is used for: determining that the total number of bits of the resource allocation field corresponding to the second resource allocation type is equal to the total number of bits of the resource allocation field corresponding to the first resource allocation type.

Furthermore, the fourth resource allocation module 33 can comprise a common resource sub-module 331 and a dedicated resource sub-module 332.

The common resource sub-module 331 is used for: according to the number of bits indicating resource allocation of resource block group subsets, determining that a resource block in each resource block group in the common resource area corresponds to an indication for indicating whether or not this resource block is to be scheduled to a user equipment.

The dedicated resource sub-module 332 is used for: according to the number of bits indicating resource allocation of resource block group subsets, determining that N resource blocks in the dedicated resource area correspond to an indication for indicating whether or not the resource blocks are to be scheduled to a user equipment, and sending the indication to the user equipment, wherein, N is equal to a value obtained by rounding up a ratio of the size of resource block group in dedicated resource area and the size of resource block group in common resource area.

As for the structure and relevant functions of this resource allocation apparatus, reference can be made to the description of the foregoing method embodiment and thus details thereof are omitted.

In this embodiment, the number of resource block group subsets corresponding to the second resource allocation type can be determined according to the number of resource blocks in the common resource area. Since the carrier supporting different versions of terminal systems has the same number of resource block group subsets, scheduling process can be simplified, repeated resource allocation can be reduced, and bandwidth resource can be saved.

One of ordinary skill in the art can understand that, all or part steps for implementing the above method embodiments can be done by hardware related to instructions and programs. These programs can be stored in a computer readable storage medium and can perform the steps of the above method embodiments when being executed. The computer readable storage medium includes media capable of storing program codes, such as ROM, RAM, magnetic disk or optical disk.

It should be noted that, the above embodiments are merely used for explaining technical solutions of the present invention but not intended to limit the present invention. Although the present invention has been described in detail with reference to the foregoing embodiments, one of ordinary skill in the art would understand that the technical solutions recited in the foregoing embodiments can be modified or some technical features therein can be equivalently replaced. All the modifications or replacements will not make the technical solution depart from the spirit and the scope of the present invention.

What is claimed is:

1. A resource allocation method, comprising:
according to a quantity of resource blocks in a common resource area of a carrier and a set first corresponding relationship, determining a first resource block group size corresponding to a first resource allocation type in the common resource area, wherein the first corresponding relationship is a corresponding relationship between the quantity of the resource blocks and a resource block group size, wherein the carrier comprises the common resource area and a dedicated resource area, wherein the common resource area is a resource area that can be used by both a terminal of a communication system of a first type and a terminal of a communication system of a second type within the carrier, and the dedicated resource area is a resource area that can be used only by the terminal of the communication system of the second type within the carrier, and wherein the communication system of the second type is an evolved system of the communication system of the first type, and wherein resource group sizes for terminals of the communication systems of the first and second types in the common resource area are both equal to the first resource block group size;

according to the first resource block group size, dividing all the resource blocks in the common resource area of the carrier into one or more first resource block groups;

determining a first quantity of bits in a resource allocation field for the common resource area according to a quantity of resource blocks in the common resource area of the carrier and the first resource block group size, wherein the first quantity of bits indicates a quantity of resource block groups in the common resource area;

determining a second quantity of bits in a resource allocation field for the dedicated resource area according to the first quantity of bits and a total quantity of bits in the resource allocation field corresponding to the first resource allocation type, wherein the second quantity of bits indicates a quantity of resource block groups in the dedicated resource area;

determining a second resource block group size corresponding to the first resource allocation type in the dedicated resource area, according to a quantity of resource blocks in the dedicated resource area and the second quantity of bits, wherein a resource group size for terminals of the communication systems of the second type in the dedicated resource area is equal to the second resource block group size;

according to the second resource block group size, dividing resource blocks in the dedicated resource area of the carrier into one or more second resource block groups, wherein each one of the one or more second resource block groups divided from the dedicated resource area corresponds to an indication for indicating whether a second resource block group is to be scheduled to a user equipment, and sending the indication to the user equipment.

2. The method of claim 1, wherein the total quantity of bits in the resource allocation field corresponding to the first resource allocation type is determined one selected from the group consisting of:
   (a) a quantity of resource blocks corresponding to the maximum system bandwidth supported by the communication system of the first type and the first corresponding relationship; and
   (b) a total quantity of resource blocks contained in the carrier and the first corresponding relationship.

3. The method of claim 1, wherein according to the quantity of resource blocks in the dedicated resource area and the second quantity of the bits, determining the second resource block group size comprises one selected from the group consisting of:
   (a) if the quantity of resource blocks of a last resource block group in the common resource area is equal to the first resource block group size, obtaining a first ratio by rounding up a quotient obtained by dividing the quantity of the resource blocks in the dedicated resource area by the second quantity of the bits;
   if the first ratio is a positive integral multiple of the first resource block group size, determining the first ratio as the second resource block group size, and, if the first ratio is not the positive integral multiple of the first resource block group size, determining a minimum integer larger than the first ratio and equal to the positive integral multiple of the first resource block group size as the second resource block group size;
   (b) if the quantity of the resource blocks of the last resource block group in the common resource area is less than the first resource block group size, adding the quantity of the resource blocks in the dedicated resource area and the quantity of the resource blocks of the last resource block group in the common resource area, thereby obtaining a first total quantity, and obtaining the first ratio by rounding up the quotient obtained by dividing the first total quantity by the second quantity of the bits; and
   if the first ratio is the positive integral multiple of the first resource block group size, determining the first ratio as the second resource block group size, and, if the first ratio is not a positive integral multiple of the first resource block group size, determining the minimum integer larger than the first ratio and equal to the positive integral multiple of the first resource block group size as the second resource block group size;
   and
   (c) if the quantity of the resource blocks of the last resource block group in the common resource area is less than the first resource block group size, obtaining the first ratio by rounding up the quotient obtained by dividing the quantity of the resource blocks in the dedicated resource area by the second quantity of the bits;
   if the first ratio is the positive integral multiple of the first resource block group size, determining the first ratio as the second resource block group size, and, if the first ratio is not the positive integral multiple of the first resource block group size, determining the minimum integer larger than the first ratio and equal to the positive integral multiple of the first resource block group size as the second resource block group size.

4. The method of claim 3, further comprising:
   if the second resource block group size is larger than a set value, replacing the second resource block group size with the set value.

5. The method of claim 1, wherein after determining the second resource block group size corresponding to the first resource allocation type in the dedicated resource area according to the total quantity of the resource blocks of the carrier and the first corresponding relationship, the method further comprises:
   according to the quantity of resource blocks in the dedicated resource area and the second resource block group size, determining the quantity of the resource block groups in the dedicated resource area, and according to the quantity of the resource block groups in the dedicated resource area, determining the second quantity of the bits in the resource allocation field for the dedicated resource area.

6. The method of claim 1, wherein according to the second resource block group size, dividing the resource blocks in the dedicated resource area of the carrier into one or more resource block groups comprises:
   if the quantity of the resource blocks of the last resource block group in the common resource area is less than the first resource block group size, calculating a difference between the second resource block group size and the quantity of the resource blocks of the last resource block group in the common resource area as a first difference;
   grouping the resource blocks of the last resource block group in the common resource area and resource blocks of a quantity equal to the first difference in the dedicated resource area that are adjacent to the common resource area in serial number into the first resource block group of the resource blocks in the dedicated resource area, or, grouping the resource blocks of the quantity equal to the first difference in the dedicated resource area that are adjacent to the common resource area in the serial number into the first resource block group of the resource blocks in the dedicated resource area; and dividing the resource blocks remaining in the dedicated resource area after removing the first resource block group into one or more resource block groups according to the second resource block group size.

7. A resource allocation method, comprising:
determining a quantity of resource block group subsets corresponding to a second resource allocation type in a carrier, according to one selected from the group consisting of (a) a quantity of resource blocks in a common resource area of the carrier and a set second corresponding relationship, and (b) a first resource block group size of a first resource allocation type in the common resource area, and allocating resource block groups of the carrier into the resource block group subsets, wherein the carrier includes the common resource area and a dedicated resource area, and the second corresponding relationship is a corresponding relationship between the quantity of the resource blocks and the quantity of the resource block group subsets, wherein the common resource area is a resource area that can be used by both a terminal of a communication system of a first type and a terminal of a communication system of a second type within the carrier, and the dedicated resource area is a resource area that can be used only by the terminal of the communication system of the second type within the carrier, and wherein the communication system of the second type is an evolved system of the communication system of the first type;
determining a total quantity of the bits in a resource allocation field corresponding to the second resource allocation type according to one selected from the group consisting of (a) a total quantity of resource blocks contained in the carrier and the second corresponding relationship and (b) a total quantity of bits in a resource allocation field corresponding to the first resource allocation type; and
according to the total quantity of the bits in the resource allocation field corresponding to the second resource allocation type, a quantity of bits required for indicating the resource block group subsets, and a quantity of bits required for indicating a resource allocation direction, determining a quantity of bits indicating resource allocation of the resource block group subsets of the second resource allocation type, according to the quantity of the bits indicating the resource allocation of the resource block group subsets, determining an indication that indicates whether a resource block in each resource block group subset is to be scheduled to a user equipment; and
sending the indication to the user equipment,
wherein for the common resource area, each bit indicates allocation of one resource block in a resource block group, while for the dedicated resource area, each bit indicates allocation of a plurality of resource blocks in a resource block group.

8. The method of claim 7, wherein according to the first resource block group size of the first resource allocation type in the common resource area, determining the quantity of the resource block group subsets corresponding to the second resource allocation type in the carrier comprises:
setting the quantity of the resource block group subsets corresponding to the second resource allocation type in the carrier to be equal to the first resource block group size corresponding to the first resource allocation type in the common resource area.

9. The method of claim 7, further comprising:
determining the resource block group size of the second resource allocation type corresponding to the carrier in the dedicated resource area and the resource block group size of the second resource allocation type corresponding to the carrier in the common resource area.

10. The method of claim 7, wherein determining the total quantity of the bits in the resource allocation field corresponding to the second resource allocation type according to the total quantity of bits in the resource allocation field corresponding to the first resource allocation type comprises setting the total quantity of the bits in the resource allocation field corresponding to the second resource allocation type to be equal to the total quantity of the bits in the resource allocation field corresponding to the first resource allocation type.

11. The method of claim 7, wherein according to the total quantity of the bits in the resource allocation field corresponding to the second resource allocation type, the quantity of the bits required for indicating the resource block group subsets, and the quantity of the bits required for indicating the resource allocation direction, determining the quantity of the bits indicating the resource allocation of the resource block group subsets of the second resource allocation type comprises:
determining the quantity of the bits indicating the resource allocation of the resource block group subsets of the second resource allocation type, which is equal to a difference obtained by subtracting the quantity of the bits required for indicating the resource block subsets and the quantity of the bits required for indicating the resource allocation direction from the total quantity of the bits in the resource allocation field corresponding to the second resource allocation type.

12. The method of claim 9, wherein according to the quantity of the bits indicating the resource allocation of the resource block group subsets, determining the indication that indicates whether the resource block in each resource block group subset is scheduled to the user equipment comprises:
according to the quantity of the bits indicating the resource allocation of the resource block group subsets, determining the indication for indicating whether the resource block in each resource block group in the common resource area is to be scheduled to the user equipment, and determining an indication for indicating whether or not resource blocks in the dedicated resource area are to be scheduled to the user equipment,
wherein one bit in the indication for indicating whether the resource blocks in the dedicated resource area are to be scheduled to the user equipment indicates whether N resource blocks in the dedicated resource area are to be scheduled to the user equipment, wherein N is equal to a value obtained by rounding up a ratio of the resource block group size in the dedicated resource area to the resource block group size in the common resource area.

13. A resource allocation apparatus, comprising:
a processor configured to:
determine a first resource block group size corresponding to a first resource allocation type in a common resource area according to a quantity of resource blocks in the common resource area of the carrier and a set first corresponding relationship that has been set, wherein the first corresponding relationship is a corresponding relationship between the quantity of the resource blocks and a resource block group size, wherein the carrier comprises the common resource area and a dedicated resource area, wherein the common resource area is a resource area that can be used by both a terminal of a communication system of a first type and a terminal of a communication system of a second type within the carrier, and the dedicated resource area is a resource area that can be used only by the terminal of the communication system of the second type within the carrier, and wherein the communication system of the second type is an evolved system of the communication system of the first type, and wherein resource group sizes for terminals of the communication systems of the first and second types in the common resource area are both equal to the first resource block group size, divide all the resource blocks in the common resource area of the carrier into one or more resource block groups according to the first resource block group size;

determine a first quantity of bits in a resource allocation field for the common resource area according to a quantity of resource blocks in the common resource area of the carrier and the first resource block group size, wherein the first quantity of bits indicates a quantity of resource block groups in the common resource area;

determining a second quantity of bits in a resource allocation field for the dedicated resource area according to the first quantity of bits and a total quantity of bits in the resource allocation field corresponding to the first resource allocation type, wherein the second quantity of bits indicates a quantity of resource block groups in the dedicated resource area;

determine a second resource block group size corresponding to the first resource allocation type in the dedicated resource area, according to a quantity of resource blocks in the dedicated resource area and the second resource block group size, wherein a resource group size for terminals of the communication systems of the second type in the dedicated resource area is equal to the second resource block group size, and divide resource blocks in the dedicated resource area of the carrier into one or more resource block groups according to the second resource block group size, wherein each resource block group divided from the resource blocks in the dedicated resource area corresponds to an indication for indicating whether the resource block group is to be scheduled to a user equipment, and a transmitter configured to transmit the indication to the user equipment.

14. The resource allocation apparatus of claim 13 wherein the total quantity of bits in the resource allocation field corresponding to the first resource allocation type is determined according to one selected from the group consisting of:

(a) a quantity of resource blocks corresponding to the maximum system bandwidth supported by the communication system of the first type and the first corresponding relationship; and (b) a total quantity of resource blocks contained in the carrier and the first corresponding relationship.

15. The resource allocation apparatus of claim 13, wherein determining the second resource block group size according to the quantity of resource blocks in the dedicated resource area and the second quantity of the bits comprises one selected from the group consisting of:

(a) if the quantity of the resource blocks of the last resource block group in the common resource area is equal to the first resource block group size, obtaining a first ratio by rounding up a quotient obtained by dividing the quantity of the resource blocks in the dedicated resource area by the second quantity of the bits;

if the first ratio is a positive integral multiple of the first resource block group size, determining the first ratio as the second resource block group size; and if the first ratio is not the positive integral multiple of the first resource block group size, determining a minimum integer larger than the first ratio and equal to a positive integral multiple of the first resource block group size as the second resource block group size;

(b) if the quantity of the resource blocks of the last resource block group in the common resource area is less than the first resource block group size, obtaining a first total quantity by adding the quantity of the resource blocks in the dedicated resource area and the quantity of the resource blocks of the last resource block group in the common resource area, and then obtaining a second ratio by rounding up a quotient obtained by dividing the first total quantity by the second quantity of the bits;

if the second ratio is the positive integral multiple of the first resource block group size, determining the second ratio as the second resource block group size, and if the second ratio is not the positive integral multiple of the first resource block group size, determining the minimum integer larger than the second ratio and equal to the positive integral multiple of the first resource block group size as the second resource block group size; and (c) if the quantity of the resource blocks of the last resource block group in the common resource area is less than the first resource block group size, obtaining a third ratio by rounding up a quotient obtained by dividing the quantity of the resource blocks in the dedicated resource area by the second quantity of the bits to an upward rounding operation;

if the third ratio is the positive integral multiple of the first resource block group size, determining the third ratio as the second resource block group size, and if the third ratio is not the positive integral multiple of the first resource block group size, determining the minimum integer larger than the third ratio and equal to the a positive integral multiple of the first resource block group size as the second resource block group size.

16. The resource allocation apparatus of claim 15, wherein the processor is further configured to:

replace the second resource block group size with the set value, if the second resource block group size is larger than a set value.

17. The resource allocation apparatus of claim 13, wherein dividing the resource blocks in the dedicated resource area of the carrier into one or more resource block groups according to the second resource block group size comprises:

calculating a difference between the second resource block group size and the quantity of the resource blocks of the last resource block group in the common resource area as a first difference, if the quantity of the resource blocks of the last resource block group in the common resource area is less than the first resource block group size; and implementing at least one selected from the group consisting of:

grouping the resource blocks of the last resource block group in the common resource area and resource blocks of a quantity equal to the first difference in the dedicated resource area that are adjacent to the common resource area in serial number into the first resource block group of resource blocks in the dedicated resource area, and grouping the resource blocks of the quantity equal to the first difference in the dedicated resource area that are adjacent to the common resource area in serial number into the first resource block group of the resource blocks in the dedicated resource area.

18. The resource allocation apparatus of claim 13, wherein the processor is further configured to:

- determine the quantity of the resource block groups in the dedicated resource area, according to the quantity of the resource blocks in the dedicated resource area and the second resource block group size, after determining the second resource block group size corresponding to the first resource allocation type in the dedicated resource area, and
- determine the second quantity of bits in a resource allocation field for indicating the dedicated resource area, according to the quantity of the resource block groups in the dedicated resource area.

19. A resource allocation apparatus, comprising:

a processor configured to

- determine a quantity of resource block group subsets corresponding to a second resource allocation type in a carrier, according to one selected from the group consisting of (a) a quantity of resource blocks in a common resource area of a carrier and a set second corresponding relationship, and (b) a first resource block group size of a first resource allocation type in the common resource area, and allocate resource block groups of the carrier into the resource block group subsets, wherein the carrier comprises the common resource area and a dedicated resource area, and the second corresponding relationship is corresponding relationship between the quantity of the resource blocks and the quantity of the resource block group subsets, wherein the common resource area is a resource area that can be used by both a terminal of a communication system of a first type and a terminal of a communication system of a second type within the carrier, and the dedicated resource area is a resource area that can be used only by the terminal of the communication system of the second type within the carrier, and wherein the communication system of the second type is an evolved system of the communication system of the first type;
- determine a total quantity of bits in a resource allocation field corresponding to the second resource allocation type according to one selected from the group consisting of (a) a total quantity of resource blocks contained in the carrier and the second corresponding relationship and (b) a total quantity of bits in a resource allocation field corresponding to the first resource allocation type;
- determine a the resource allocation field, the quantity of bits required for indicating the resource block group subsets, and the number of bits required for indicating a resource allocation direction, and
- determine an indication that indicates whether a resource block in each resource block group subset is to be scheduled to a user equipment, according to the quantity of bits indicating the resource allocation of the resource block group subsets; and
- a transmitter configured to transmit the indication to the user equipment,
- wherein for the common resource area, each bit indicates allocation of one resource block in a resource block group, while for the dedicated resource area, each bit indicates allocation of a plurality of resource blocks in a resource block group.

20. The apparatus of claim 19, wherein determining the total quantity of the bits in the resource allocation field corresponding to the second resource allocation type according to the total quantity of bits in the resource allocation field corresponding to the first resource allocation type comprises setting the total quantity of the bits in the resource allocation field corresponding to the second resource allocation type to be equal to the total quantity of the bits in the resource allocation field corresponding to the first resource allocation type.

21. The apparatus of claim 19, wherein determining the quantity of the resource block group subsets corresponding to the second resource allocation type in the common resource area of the carrier according to the first resource block group size of the first resource allocation type comprises,

- determining the quantity of the resource block group subsets corresponding to the second resource allocation type in the common resource area of the carrier, wherein the quantity of the resource block group subsets is equal to the first resource block group size corresponding to the first resource allocation type in the common resource area.

22. The apparatus of claim 19, wherein the processor is further configured to:

- determine the resource block group size of the second resource allocation type corresponding to the carrier in the dedicated resource area and the resource block group size of the second resource allocation type corresponding to the carrier in the common resource area.

23. The apparatus of claim 19, wherein determining the indication that indicates whether the resource block in each resource block group subset is scheduled to the user equipment according to the quantity of the bits indicating the resource allocation of the resource block group subsets comprises:

- determining an indication for indicating whether a resource block in each resource block group in the common resource area is to be scheduled to the user equipment, and determining an indication for indicating whether resource blocks in the dedicated resource area are scheduled to the user equipment, according to the quantity of the bits indicating resource allocation of the resource block group subsets;
- wherein one bit in the indication for indicating whether resource blocks in the dedicated resource area are to be scheduled to the user equipment indicates whether N resource blocks in the dedicated resource area are to be scheduled to the user equipment, wherein N is equal to a value obtained by rounding up a ratio of the resource block group size in dedicated resource area to the resource block group size in the common resource area.

* * * * *

UNITED STATES PATENT AND TRADEMARK OFFICE
CERTIFICATE OF CORRECTION

| | | |
|---|---|---|
| PATENT NO. | : 9,179,441 B2 | Page 1 of 1 |
| APPLICATION NO. | : 13/748019 | |
| DATED | : November 3, 2015 | |
| INVENTOR(S) | : Xue et al. | |

It is certified that error appears in the above-identified patent and that said Letters Patent is hereby corrected as shown below:

Claims

Column 37, Claim 19, line 46, "a the" should read -- a --.

Signed and Sealed this
Seventh Day of June, 2016

Michelle K. Lee
*Director of the United States Patent and Trademark Office*